United States Patent
Horie et al.

(10) Patent No.: US 7,135,506 B2
(45) Date of Patent: Nov. 14, 2006

(54) OIL BASED INK COMPOSITION FOR INKJET PRINTER AND METHOD OF FORMING IMAGE USING THE SAME

(75) Inventors: Seiji Horie, Shizuoka (JP); Yutaka Sakasai, Shizuoka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 218 days.

(21) Appl. No.: 10/668,158

(22) Filed: Sep. 24, 2003

(65) Prior Publication Data

US 2004/0063811 A1    Apr. 1, 2004

(30) Foreign Application Priority Data

Sep. 27, 2002 (JP) .......................... P. 2002-283416
Sep. 30, 2002 (JP) .......................... P. 2002-286110

(51) Int. Cl.
*C09D 11/10* (2006.01)
*C08L 53/00* (2006.01)

(52) U.S. Cl. ....................................... 523/160; 524/505
(58) Field of Classification Search ................ 523/160, 523/161

See application file for complete search history.

(56) References Cited

U.S. PATENT DOCUMENTS

| | | | | | |
|---|---|---|---|---|---|
| 5,254,425 | A | * | 10/1993 | Suzuki et al. | ................ 430/115 |
| 6,127,452 | A | * | 10/2000 | Kato | ........................... 523/160 |
| 6,302,537 | B1 | * | 10/2001 | Kato | ........................... 347/100 |
| 6,465,567 | B1 | * | 10/2002 | Grobe et al. | ................. 524/611 |
| 2002/0058729 | A1 | * | 5/2002 | Oshima | ........................ 523/160 |
| 2002/0128349 | A1 | * | 9/2002 | Qian et al. | ................... 523/160 |

FOREIGN PATENT DOCUMENTS

| | | |
|---|---|---|
| JP | 5-202329 | 8/1993 |
| JP | 5-320551 | 12/1993 |
| JP | 2001-279139 | 10/2001 |

* cited by examiner

*Primary Examiner*—Callie Shosho
(74) *Attorney, Agent, or Firm*—Buchanan Ingersoll & Rooney PC

(57) ABSTRACT

An oil based ink composition for inkjet printer comprising a coloring agent and a binder resin in a non-aqueous dispersion medium, wherein the binder resin comprises a block copolymer having a repeating unit (a) corresponding to a monofunctional monomer containing an aliphatic cyclic hydrocarbon group having from 5 to 30 carbon atoms or a graft copolymer having the repeating unit (a) in the main chain thereof.

4 Claims, No Drawings

OIL BASED INK COMPOSITION FOR INKJET PRINTER AND METHOD OF FORMING IMAGE USING THE SAME

FIELD OF THE INVENTION

The present invention relates to an oil based ink composition for use in an inkjet recording device, which discharges ink to form letters or images on an ink receiving medium, for example, recording paper, and a method of forming an image using the same. In particular, the invention relates to an oil based ink composition comprising a pigment dispersion in a non-aqueous dispersion medium and a method of forming an image using the same.

BACKGROUND OF THE INVENTION

Hitherto, inkjet recording systems are broadly divided into two groups, a continuous type and an on-demand type. In the continuous type, ink droplets are continuously generated, charge amounts of the ink droplets used for the formation of image are controlled, and the ink droplets are passed through a electrostatic field formed between deflecting electrodes to control the flight passages thereof. In the on-demand type, ink is discharged only when printing is carried out.

The mainstream inks to be used for such inkjet recording systems are inks prepared by dissolving various water-soluble dyes in water or a solvent composed of water and a water-soluble organic solvent and optionally adding various additives thereto (hereinafter referred to as "aqueous dye ink"). However, in the case where printing is practically carried out using the aqueous dye ink, many drawbacks are encountered in that the ink blurs on recording paper depending on the kind of paper, whereby high-quality print can not be obtained, in that a formed recorded image is poor in water resistance and light fastness, in that drying of ink on recording paper is so slow that streaks occur, and in that a recorded image is deteriorated due to color mixing (color turbidity or color unevenness occurred on the interface when dots having different colors are printed adjacent to each other).

For improving the water resistance and light fastness of recorded image that are the problems of aqueous dye ink as described above, there have been made various proposals to apply pigment based ink comprising fine particles of pigment dispersed in an aqueous dispersion medium or a non-aqueous dispersion medium to the inkjet recording system. For example, inks for inkjet printer comprising a pigment dispersed in a solvent mainly composed of water are proposed (refer to Patent Documents 1 to 5 shown below). However, there is a problem in that since the pigment is insoluble in the medium, dispersion stability of the ink is ordinarily poor to likely cause clogging in a nozzle section.

On the other hand, ink comprising a pigment dispersed in a non-polar insulating solvent (hereinafter referred to as "oil based pigment ink") has advantages in that it is less in blur due to good absorption into paper and in that a recorded image is good in water resistance. For example, oil based pigment ink in which pigment is finely divided with an alcoholamide based dispersant (refer to Patent Document 6 shown below) and oil based pigment ink in which pigment is finely divided with a sorbitan based dispersant (refer to Patent Document 7 shown below) are proposed. However, such inks still have a problem in that the clogging of ink in a nozzle section is liable to occur, because it is not sufficient to uniformly disperse the pigment particles in the state of fine particles in the non-polar insulating solvent and the dispersion stability thereof is inferior. In addition, there is a severe defect in that the ink is poor in scratch resistance because the pigment itself does not have a fixing ability on recording paper.

For resolving these problems, there are proposed resin dissolution type oil based inks using a resin soluble in the non-polar insulating solvent as both a fixing agent and a pigment dispersant. For example, ink containing a terpene phenol based resin as the above-described resin is proposed in Patent Document 8 (JP-A-3-234772) (the term "JP-A" as used herein means an "unexamined published Japanese patent application"). However, the ink is still insufficient with respect to the dispersion stability of pigment and is questionable in its reliability. Moreover, since the resin is dissolved in the non-polar solvent, the resin does not remain in an amount sufficient for completely fixing the pigment on recording paper, so that water resistance and scratch resistance are not sufficient.

Further, inks containing an alicyclic saturated hydrocarbon as a resin soluble in the non-polar insulating solvent are proposed in Patent Document 9 (JP-A-5-202329) and Patent Document 10 (JP-A-5-320551). However, the inks are insufficient in the dispersion stability and scratch resistance and when the amount of resin added is increased in order to ensure the scratch resistance, viscosity of the ink increases to cause a problem in that the ink cannot be discharged.

Thus, for obtaining high-level scratch resistance, it is proposed to coat pigment particles with a resin insoluble or semi-soluble in the non-polar insulating solvent. For example, oil based ink comprising a pigment coated with a resin by microencapsulation, etc. is proposed in Patent Document 11 (JP-A-4-25574). However, since it is difficult to uniformly disperse the pigment-included resin particles in the state of fine particle and the dispersion stability thereof is not sufficient, there is a problem in its reliability as ink. In addition, in recent years, high image quality of photographic image is attained by ordinary inkjet printers using the aqueous dye ink. With respect to the pigment ink, for increasing color forming property and transparency, it is required to make pigment fine as far as possible and to keep the dispersion state thereof stably.

In contrast, however, when the pigment is made finer, crushing of primary pigment particles occurs simultaneously with pulverization of the pigment. Further, since cohesive energy simultaneously becomes large due to increase of surface energy, re-coagulation of the pigment particles is apt to occur. As a result, a problem occurs in that storage stability of the finely divided pigment dispersion is impaired. As described above, with respect to the pigment dispersion used in oil based pigment ink for inkjet printer, pulverization at a higher level is demanded. However, high-level techniques are required for dispersing pigment in the state of fine particle, and it is very difficult to increase the dispersion stability thereof. Therefore, development of oil based pigment ink capable of meeting the above-described requirements has been desired.

A black ink for electrostatic inkjet recording device having a volume resistivity of from $10^7$ to $10^{11}$ $\Omega \cdot m$ and containing carbon black, a phthalocyanine blue pigment and at least one synthetic resin selected from a hydrocarbon resin, an alkyd resin and an acrylic resin is described in Patent Document 12 (JP-A-2001-279139)

It is required for the binder resin for dispersing and coating a coloring agent to ordinarily have characteristics, for example, (1) that it can sufficiently coat the surface of pigment to form a colored admixture, which reveals an appropriate fluidity upon heat, etc., (2) that it can well disperse a coloring agent in a dispersion medium by coating, (3) that it is as transparent as possible, and (4) that it firmly adheres to a recording medium by fixing to exert sufficient scratch resistance.

In view of the characteristics required to the binder resin, for example, the function of being adsorbed onto a coloring agent to well disperse the coloring agent in the dispersion medium and the function of firmly adhering to a recording medium to exert sufficient scratch resistance, it is ideal that the binder resin has as fundamental components a component solvating with the dispersion medium, a component hardly solvating with the dispersion medium and a component having a polar group. However, it is difficult to find out the binder resin that satisfies all of the characteristics described above.

Patent Document 1: JP-A-2-255875
Patent Document 2: JP-A-3-76767
Patent Document 3: JP-A-3-76768
Patent Document 4: JP-A-56-147871
Patent Document 5: JP-A-56-147868
Patent Document 6: JP-A-57-10660
Patent Document 7: JP-A-57-10661
Patent Document 8: JP-A-3-234772
Patent Document 9: JP-A-5-202329
Patent Document 10: JP-A-5-320551
Patent Document 11: JP-A-4-25574
Patent Document 12: JP-A-2001-279139

SUMMARY OF THE INVENTION

Therefore, an object of the invention is to provide an oil based ink composition for inkjet printer in which a pigment is uniformly dispersed in the state of fine particle and dispersion stability of the pigment dispersion is excellent, and which has high discharge stability free from the occurrence of clogging in a nozzle section.

Another object of the invention is to provide an oil based ink composition for inkjet printer, which has excellent drying property on recording paper, excellent water resistance and light fastness of recorded image, and high-level scratch resistance.

A further object of the invention is to provide an oil based ink composition for inkjet printer, which is capable of providing a large number of prints having clear color images of good quality without ink blur.

Other objects of the invention will become apparent from the following description.

As a result of the intensive investigations, it has been found that the above-described objects can be attained by the following constructions:

(1) An oil based ink composition for ink jet printer comprising a coloring agent and a binder resin in a non-aqueous dispersion medium, wherein the binder resin comprises a block copolymer having a repeating unit (a) corresponding to a monofunctional monomer containing an aliphatic cyclic hydrocarbon group having from 5 to 30 carbon atoms or a graft copolymer having the repeating unit (a) in the main chain thereof.

(2) The oil based ink composition for inkjet printer as described in item (1) above, wherein the binder resin comprises a block copolymer having the repeating unit (a) corresponding to a monofunctional monomer containing an aliphatic cyclic hydrocarbon group having from 5 to 30 carbon atoms and a repeating unit (b1) corresponding to a monofunctional monomer, which is capable of copolymerizing with the monofunctional monomer of the repeating unit (a) and a homopolymer of which is soluble in the non-aqueous dispersion medium.

(3) The oil based ink composition for inkjet printer as described in item (1) above, wherein the binder resin comprises a graft copolymer having the repeating unit (a) corresponding to a monofunctional monomer containing an aliphatic cyclic hydrocarbon group having from 5 to 30 carbon atoms in the main chain thereof and a repeating unit (b2) corresponding to a macromonomer, which is capable of copolymerizing with the monofunctional monomer of the repeating unit (a) and is soluble in the non-aqueous dispersion medium in the graft portion (side chain) thereof.

(4) The oil based ink composition for inkjet printer as described in any one of items (1) to (3) above, wherein the repeating unit (a) is a repeating unit represented by the following formula (I):

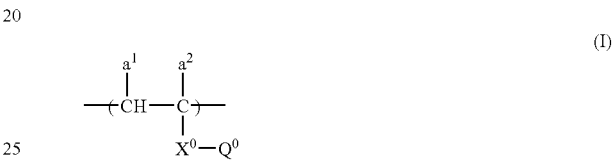

In formula (I), $X^0$ represents a connecting group selected from —COO—, —OCO—, —$(CH_2)_k$—OCO—, —$(CH_2)_k$—COO—, —COO$(CH_2)_k$—, —COO$(CH_2O)_k$—, —CONHCOO—, —CONHCONH—, —O—, and a combination of these groups; k represents an integer of from 1 to 3; $a^1$ and $a^2$, which may be the same or different, each represent a hydrogen atom, a halogen atom, a cyano group, an alkyl group, —COO—$Z^1$, or —COO—$Z^1$ connected through a hydrocarbon group; $Z^1$ represents a hydrogen atom or an hydrocarbon group; and $Q^0$ represents an aliphatic cyclic hydrocarbon group having from 5 to 30 carbon atoms.

(5) The oil based ink composition for inkjet printer as described in any one of items (1) to (4) above, which further comprises a dispersant for pigment.

(6) A method of forming an image by an inkjet recording system using the oil based ink composition as described in any one of items (1) to (5) above.

DETAILED DESCRIPTION OF THE INVENTION

The invention will be described in detail below.

The binder resin for use in the invention comprises a block copolymer having a repeating unit (a) corresponding to a monofunctional monomer A containing an aliphatic cyclic hydrocarbon group having from 5 to 30 carbon atoms or a graft copolymer having the repeating unit (a) in the main chain thereof. It is preferred that the block copolymer or graft copolymer is hardly soluble in the non-aqueous dispersion medium, is in the form of wax or solid at ambient temperature, and has a function of fixing the coloring agent after the image formation on a recording medium. The term "hardly soluble" as used herein with respect to the block copolymer or graft copolymer means that the solubility of the copolymer is not more than 1 g per one liter of Isopar G at 25° C.

In the invention, the repeating unit (a) is preferably represented by formula (I) described above.

In formula (I), Xo represents a connecting group selected from —COO—, —OCO—, —$(CH_2)_k$—OCO—, —$(CH_2)_k$—COO—, —COO$(CH_2)_k$—, —COO$(CH_2O)_k$—, —CONHCOO—, —CONHCONH—, —O—, and a combination of these groups, wherein k represents an integer of from 1 to 3.

$a^1$ and $a^2$, which may be the same or different, each preferably represent a hydrogen atom, a halogen atom (for example, a chlorine atom or a bromine atom), a cyano group, an alkyl group having from 1 to 3 carbon atoms (for example, a methyl group, an ethyl group or a propyl group), —COO—$Z^1$, or —COO—$Z^1$ connected through a hydrocarbon group, wherein $Z^1$ represents a hydrogen atom or an hydrocarbon group, which may be substituted, and preferably a hydrogen atom, an alkyl group having from 1 to 18 carbon atoms, an alkenyl group, an aralkyl group, an alicyclic group or an aryl group, each of these groups maybe substituted. The hydrocarbon group for connecting —COO—$Z^1$ is preferably an alkylene group, for example, —$CH_2$—.

$Q^0$ represents an aliphatic cyclic hydrocarbon group having from 5 to 30 carbon atoms.

The aliphatic cyclic hydrocarbon group is a hydrocarbon group constituting a cyclic structure having from 5 to 30 carbon atoms including, for example, monocyclic, polycyclic, bridged cyclic and spiro cyclic structures.

Specifically, groups containing a monocyclo, bicyclo, tricyclo, tetracyclo or pentacyclo structure and having not less than 5 carbon atoms are enumerated. The aliphatic cyclic hydrocarbon group preferably has from 6 to 25 carbon atoms.

Examples of structure of the alicyclic portion in the aliphatic cyclic hydrocarbon group (hereinafter also referred to as an alicyclic hydrocarbon group) are set forth below. In the examples, each structure may contain a non-conjugated double bond.

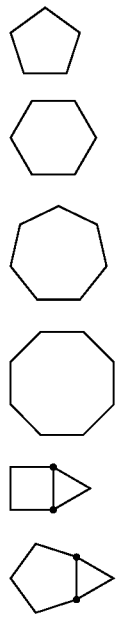

(1)

(2)

(3)

(4)

(5)

(6)

-continued

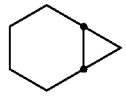
(7)

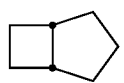
(8)

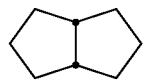
(9)

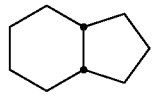
(10)

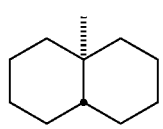
(11)

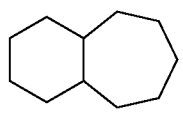
(12)

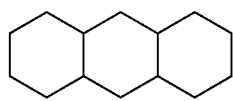
(13)

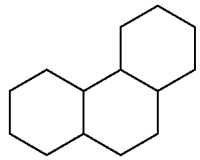
(14)

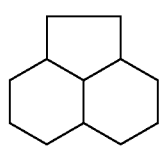
(15)

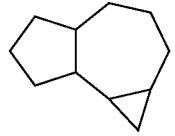
(16)

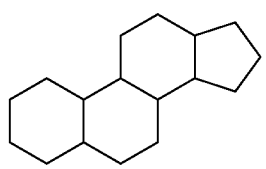
(17)

-continued
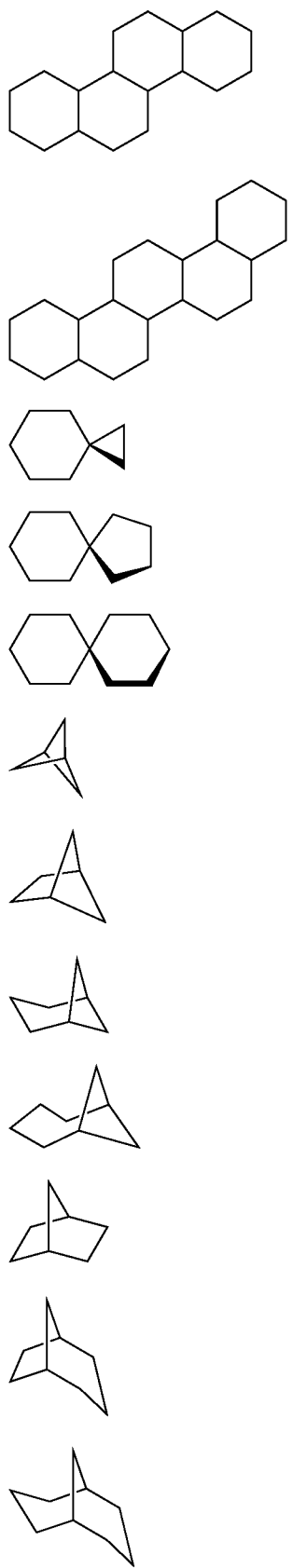
-continued
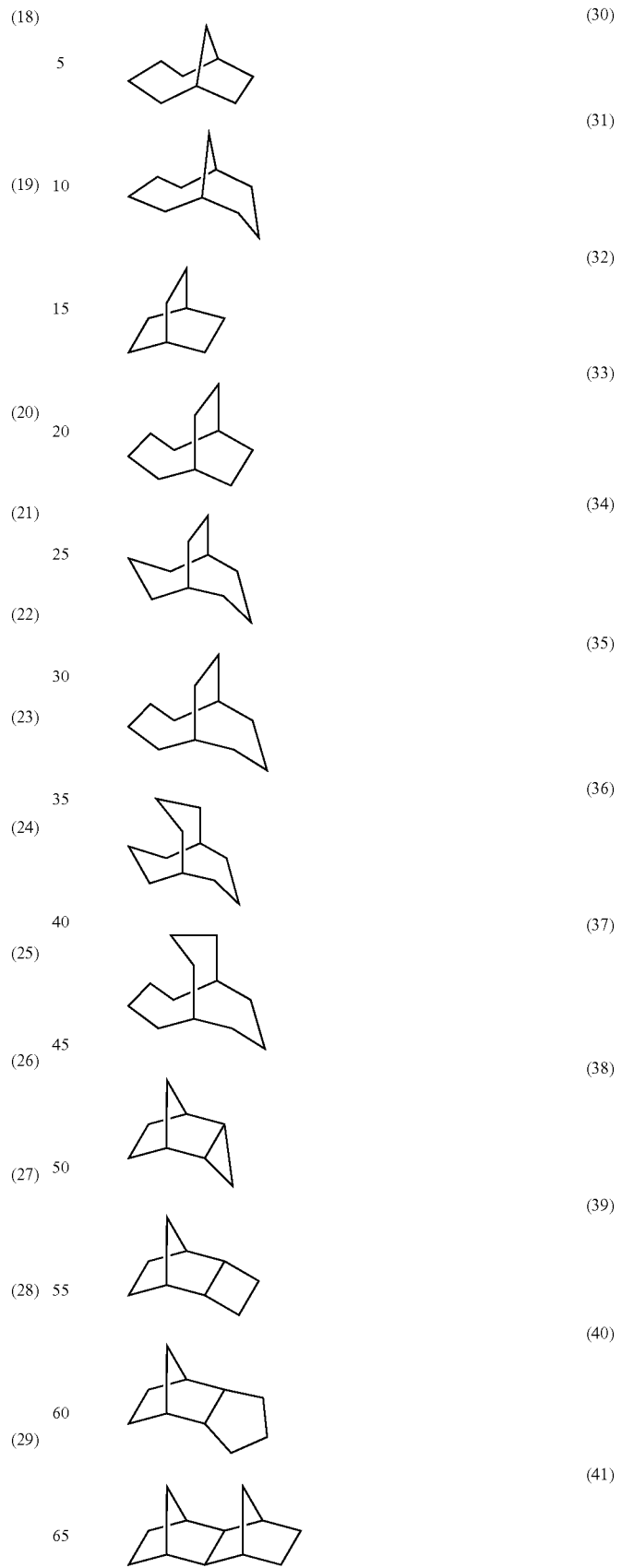

-continued

 (42)

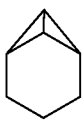 (43)

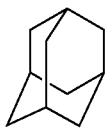 (44)

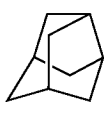 (45)

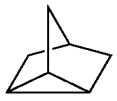 (46)

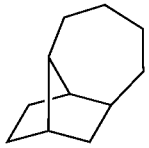 (47)

 (48)

 (49)

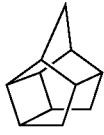 (50)

The alicyclic hydrocarbon group may have one or more substituents. Examples of the substituent on the alicyclic hydrocarbon group include an alkyl group, a substituted alkyl group, a halogen atom (for example, a fluorine atom, a chlorine atom, a bromine atom or an iodine atom), a cyano group, a hydroxy group, a nitro group, an alkoxy group, a carboxy group, an amido group, an acyl group and an alkoxycarbonyl group.

The alkyl group is preferably a lower alkyl group, for example, a methyl group, an ethyl group, a propyl group, an isopropyl group, a butyl group, a pentyl group or a hexyl group, and more preferably a methyl group, an ethyl group, a propyl group or a butyl group. Examples of the substituent for the substituted alkyl group include a hydroxy group, a halogen atom and an alkoxy group.

The alkoxy group or that in the alkoxycarbonyl group is preferably an alkoxy group having from 1 to 4 carbon atoms, for example, a methoxy group, an ethoxy group, a propoxy group or a butoxy group.

The amido group includes preferably a monoalkylamido group or a dialkylamido group. The alkyl group has the same meaning as the alkyl group defined above.

The acyl group includes an aliphatic group having from 1 to 6 carbon atoms (for example, a methyl group, an ethyl group, a propyl group, an isopropyl group, a butyl group, a pentyl group or a hexyl group).

The substituents for the alicyclic hydrocarbon group are not restricted to those described above and any substituent is preferably used as long as a homopolymer made of monomer corresponding to the repeating unit (a) having the substituent is insoluble in the non-aqueous solvent.

Preferred examples of the monofunctional monomer containing an aliphatic cyclic hydrocarbon group having from 5 to 30 carbon atoms are set forth below, but the invention should not be construed as being limited thereto.

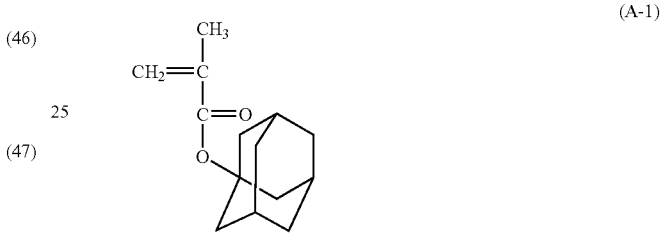 (A-1)

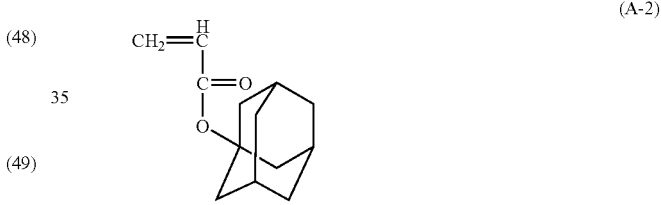 (A-2)

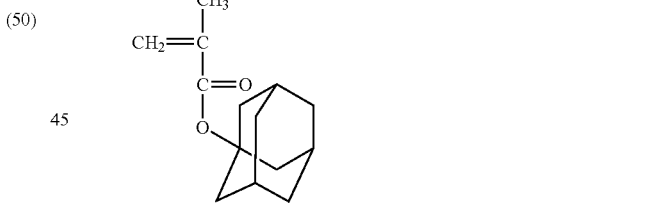 (A-3)

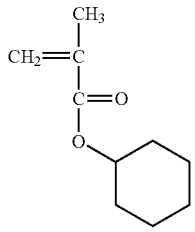 (A-4)

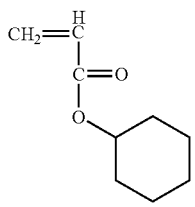 (A-5)

-continued
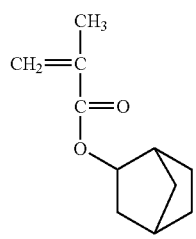
(A-6)
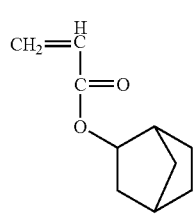
(A-7)
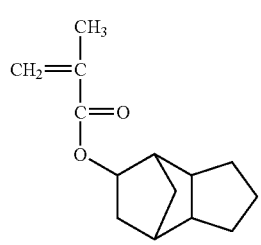
(A-8)
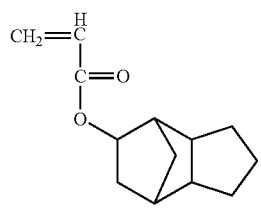
(A-9)
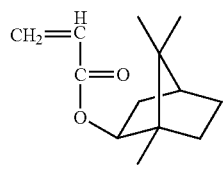
(A-10)
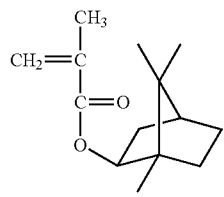
(A-11)
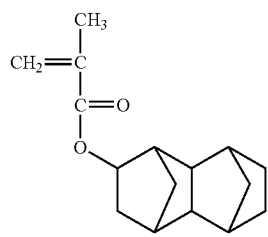
(A-12)
-continued
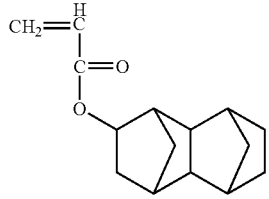
(A-13)
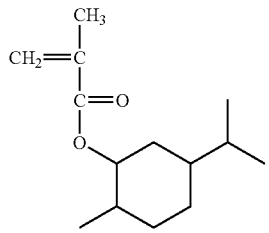
(A-14)
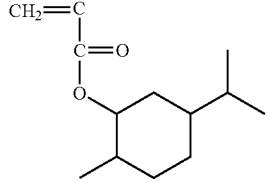
(A-15)
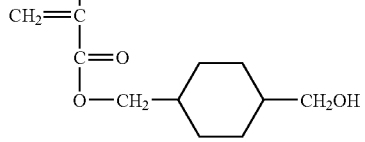
(A-16)
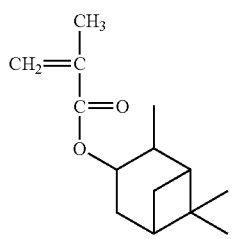
(A-17)
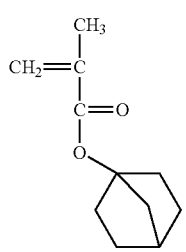
(A-18)
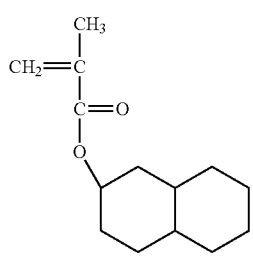
(A-19)

-continued

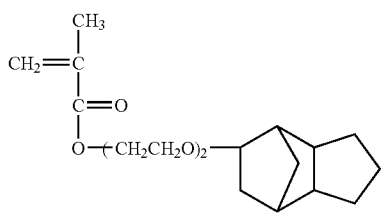
(A-20)

Now, the repeating unit (b1), which is used in the block copolymer for the binder resin according to the invention and corresponds to a monofunctional monomer B1 that is capable of copolymerizing with the monofunctional monomer A described above and a homopolymer of which is soluble in the non-aqueous dispersion medium is described below.

The repeating unit (b1) preferably includes a repeating unit represented by the following formula (II):

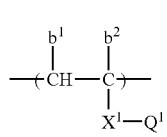
(II)

In formula (II), $X^1$, $b^1$ and $b^2$ have the same meanings as $X^0$, $a^1$ and $a^2$ defined in formula (I), respectively.

In formula (II), $Q^1$ represents an aliphatic group having not less than 8 carbon atoms. The aliphatic group may be a straight chain or branched aliphatic group, may have a substituent, for example, a halogen atom, a hydroxy group, an amino group or an alkoxy group, or may contain a hetero atom, for example, an oxygen atom, a sulfur atom or a nitrogen atom between the carbon atom-carbon atom bond in the main chain thereof. Specific examples of the aliphatic group include an octyl group, a decyl group, a dodecyl group, a tridecyl group, a tetradecyl group, a hexadecyl group, an octadecyl group, a docosyl group, a dodecenyl group, a hexadecenyl group, an oleyl group, a linoleyl group and a docosenyl group.

Specific examples of the monofunctional monomer containing a long chain aliphatic group having not less than 8 carbon atoms and capable of copolymerizing with the monofunctional monomer for constituting the repeating unit (a) include esters of unsaturated carboxylic acids (for example, acrylic acid, α-fluoroacrylic acid, α-chloroarylic acid, α-cyanoacrylic acid, methacrylic acid, crotonic acid, maleic acid or itaconic acid) containing an aliphatic group having from 10 to 32 carbon atoms in total; amides of the above-described unsaturated carboxylic acids; vinyl esters or allyl esters of higher fatty acids (examples of the higher fatty acid include lauric acid, myristic acid, stearic acid, oleic acid, linolic acid and behenic acid); and vinyl ethers in which an aliphatic group having from 10 to 32 carbon atoms in total is bound to an oxygen atom (examples of the aliphatic group include those described for the unsaturated carboxylic acid ester above); and vinyl acetate.

The block copolymer for the binder resin used in the invention may contain other monomer C1 together with the monofunctional monomer A containing an aliphatic cyclic hydrocarbon group having from 5 to 30 carbon atoms and the monofunctional monomer B1, which is capable of copolymerizing with the monofunctional monomer A and a homopolymer of which is soluble in the non-aqueous dispersion medium. The monomer C1 may be incorporated into a block comprising the monofunctional monomer A and/or a block comprising the monofunctional monomer B1.

The monomer C1 is any monomer as long as it is capable of copolymerizing with the monofunctional monomer A and the monofunctional monomer B1.

Specific examples of the monomer C1 include a vinyl ester or allyl ester of an aliphatic carboxylic acid having from 1 to 6 carbon atoms (for example, acetic acid, propionic acid, butyric acid or monochloroacetic acid); an alkyl or aryl ester or an alkyl or aryl amide of an unsaturated carboxylic acid (for example, acrylic acid, methacrylic acid, crotonic acid, itaconic acid or maleic acid) wherein the alkyl group has from 1 to 6 carbon atoms, which may be substituted (examples of the alkyl group include a methyl group, an ethyl group, a propyl group, a butyl group, a pentyl group, a 2-chloroethyl group, a 2-bromoethyl group, a 2-hydroxyethyl group, a 2-cyanoethyl group, a 2-nitroethyl group, a 2-methoxyethyl group, a 3-ethoxypropyl group, a 2-phophonoethyl group, a 3-sulfopropyl group, a 2,3-dihydroxypropyl group, a benzyl group, a phenethyl group, a 2-naphthylethyl group, a 2-(N,N-dimethylamino)ethyl group, a 2-(N,N-diethylamino)ethyl group, a 2-methanesulfonylethyl group, a 2-benzenesulfonylethyl group, a 2-carboxyethyl group, a 4-carboxybutyl group, a 3-chloropropyl group, a 2-hydroxy-3-chloropropyl group, a 2-furfurylethyl group, a 2-thienylethyl group or a 2-carboxyamidoethyl group) and the aryl group may be substituted (examples of the aryl group include a phenyl group, a naphthyl group, an anthranyl group, a cyanophenyl group, a chlorophenyl group, a tolyl group, a xylyl group, a mesityl group, a methoxyphenyl group, an acetophenyl group, a methoxycarbonylphenyl group, a carboxyphenyl group or an N,N-dimethylaminomethylphenyl group; a styrene derivative (for example, styrene, vinyltoluene, α-methylstyrene, vinylnaphthalene, chlorostyrene, dichlorostyrene, bromostyrene, vinylbenzncarboxylic acid, chloromethyl-styrene, hydroxymethylstyrene, methoxymethylstyrene, vinylbenzenecarboxamide or vinylbenzenesulfonamide); an unsaturated carboxylic acid (for example, acrylic acid, methacrylic acid, crotonic acid, maleic acid or itaconic acid); a cyclic acid anhydride of maleic acid or itaconic acid; acrylonitrile; methacrylonitrile; and a heterocyclic compound containing a polymerizable double bond group (specifically, the compounds described in Kobunshi Gakkai ed.,*Polymer Data Handbook—Fundamental Edition—*, pages 175 to 184, Baifukan Co., Ltd. (1986), for example, N-vinylpyridine, N-vinylimidazole, N-vinylpyrrolidone, vinylthiophene, vinyltetrahydrofuran, vinyloxazoline, vinylthiazole or N-vinylmorpholine). Two or more of the monomers C1 may be included in the copolymer of the binder resin.

It is preferred to use an alkyl (having from 1 to 3 carbon atoms) ester of an unsaturated carboxylic acid as the monomer C1. Examples of the alkyl (having from 1 to 3 carbon atoms) ester of an unsaturated carboxylic acid include an alkyl (having from 1 to 3 carbon atoms) ester of acrylic acid, methacrylic acid or crotonic acid, for example, methyl acrylate, methyl methacrylate, methyl crotonate, ethyl acrylate, ethyl methacrylate, ethyl crotonate, propyl acrylate, propyl methacrylate or propyl crotonate.

The block copolymer for the binder resin used in the invention is a block copolymer comprising the monomer A, the monomer B1 and optionally the monomer C1. The structure of the block copolymer is not restricted and includes a star block copolymer in addition to an AB block copolymer and an ABA block copolymer.

Now, the star block copolymer for the binder resin is described in greater detail below. The star block copolymer comprises an organic moiety having at least three polymer chains each comprising a block A and a block B and is represented, for example, by the following formula:

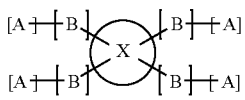

In the above formula, X represents an organic moiety, [A] represents a block A, [B] represents a block B, and [A]—[B] represents a polymer chain.

In the star block polymer, each polymer chain comprises a block A and a block B, and with respect to the order of the block A and the block B in the polymer chain, one terminal of a polymer main chain of the block B bonds to the organic moiety and the other terminal of the polymer main chain of the block B bonds to a polymer main chain of the block A. The block A and the block B in each polymer chain comprise the same kind of monomers, respectively.

In the star block polymer, an upper limit of a number of the A—B block polymer chains present therein is at most 15, and ordinarily about 10.

The organic moiety to which at least three polymer chains are bonded is not particularly restricted and any organic moiety having a molecular weight of 1,000 or less maybe used. Examples of the organic moiety include three or higher valent hydrocarbon moieties shown below.

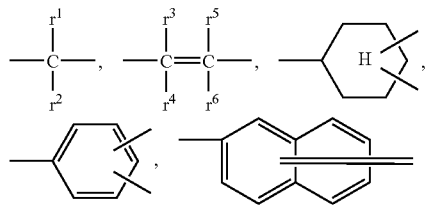

wherein $r^1$ to $r^6$ each represents a hydrogen atom or a hydrocarbon group, provided that at least one of $r^1$ and $r^2$ is bonded to the polymer chain and at least one of $r^3$ to $r^6$ is bonded to the polymer chain.

The organic moieties may be employed individually or as an appropriate combination thereof. In case of the combination, the combination may further contain an appropriate linking unit, for example, —O—, —S—, —N($r^7$)—, —COO—, —CON($r^7$)—, —SO$_2$—, —SO$_2$N($r^7$)—(wherein $r^7$ represents a hydrogen atom or a hydrocarbon group), —NHCOO—, —NHCONH— and a heterocyclic ring containing a hetero atom, for example, an oxygen atom, a sulfur atom or a nitrogen atom (e.g., thiophene, pyridine, pyran, imidazole, benzimidazole, furan, piperidine, pyrazine, pyrrole or piperazine ring).

Other examples of the organic moiety to which the polymer chains are bonded include those comprising a combination of a linking unit shown below with the linking unit described above. However, specific examples of the organic moiety according to the present invention should not be construed as being limited to those described above.

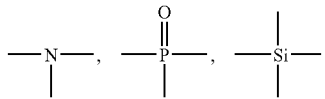

The block copolymer used as the binder resin in the invention comprises at least one repeating unit (a) corresponding to the monofunctional monomer A containing an aliphatic cyclic hydrocarbon group having from 5 to 30 carbon atoms and at least one repeating unit (b1) corresponding to the monofunctional monomer B1, which is capable of copolymerizing with the monofunctional monomer A and a homopolymer of which is soluble in the non-aqueous dispersion medium. It is preferred that a content of the monomer Al is from 30 to 95 parts by weight and a content of the monomer B1 is from 5 to 70 parts by weight based on 100 parts by weight of the block copolymer.

More preferably, the content of the monomer A is from 40 to 90 parts by weight and the content of the monomer B1 is from 10 to 60 parts by weight. A content of the monomer C1 is preferably not more than 50 parts by weight, and more preferably not more than 40 parts by weight based on 100 parts by weight of the block copolymer.

The block copolymer, which is used as the binder resin in the invention, can be synthesized by utilizing conventionally known synthesis methods of block copolymer using monomers containing a polymerizable double bond group.

For instance, a method of polymerization reaction using a carbanion as an initiator can be employed. Specifically, the block polymer can be synthesized according to the methods described, for example, in M. Morton, T. E. Helminiak, et al, *J. Polym. Sci.,* 57, 471 (1962), B. Gordon III, M. Blumenthal, J. E. Loftus et al, *Polym. Bull.,* 11, 349 (1984), and R. B. Bates, W. A. Beavers, et al, *J. Org. Chem.,* 44, 3800 (1979).

In case of using a monomer B1 containing a polar group corresponding to the repeating unit (b1), the polar group is previously protected to form a functional group and after the synthesis of a block copolymer, the protective functional group is removed by a deprotection reaction, for example, hydrolysis reaction, hydrogenolysis reaction, oxidation reaction or photolysis reaction, thereby synthesizing a block copolymer comprising the monomer containing a polar group.

For instance, such block copolymers can be synthesized according to the methods described, for example, in P. Lutz, P. Masson, et al, *Polym. Bull.,* Vol. 12, page 79 (1984), B. C. Anderson, G. D. Andrews, et al, *Macromolecules,* Vol. 14, page 1601 (1981), T. W. Greene, *Protective Groups in Organic Synthesis,* John Wiley & Sons (1981), J. F. W. McOmie, *Protective Groups in Organic Chemistry,* Plenum Press, (1973), Toshinobu Higashimura and Mitsuo Sawamoto, *Kobunshi Ronbunshu,* Vol. 46, page 189 (1989), Takuzo Aida and Shohei Inoue, *Yuki Gosei Kagaku,* Vol. 43, page 300 (1985), Takayuki Otsu, *Kobunshi,* Vol. 37, page 248 (1988), JP-A-64-111, JP-A-64-26619.

In another method, such block copolymers can be synthesized by conducting a polymerization reaction under light irradiation using a monomer having an unprotected polar group and a dithiocarbamate group-containing compound and/or a xanthate group-containing compound as an initiator. For example, the polymer can be synthesized according to the synthesis methods described, e.g., in Takayuki Otsu, *Kobunshi,* 37, 248 (1988), Shunichi Himori and Ryuichi Otsu, *Polym. Rep. Jap.* 37, 3508 (1988), JP-A-64-111, JP-A-64-26619, Nobuyuki Higashi, et al, *Polymer Preprints Japan,* 36(6) 1511 (1987), and M. Niwa, N. Higashi, et al, *J. Macromol. Sci. Chem*, A24(5), 567 (1987).

Now, the repeating unit (b2), which is used in the graft copolymer of the binder resin according to the invention and corresponds to the macromonomer that is capable of copolymerizing with the monofunctional monomer corresponding to the repeating unit (a) described above and is soluble in the non-aqueous dispersion medium is described below.

The macromonomer (M) forming the repeating unit (b2) that is capable of copolymerizing with the monofunctional monomer A corresponding to the repeating unit (a) described above and is soluble in the non-aqueous dispersion medium is preferably a macromonomer (M) having a weight average molecular weight of from $1 \times 10^3$ to $4 \times 10^4$ in which a polymerizable double bond group represented by formula (III) shown below is connected to a terminal of the main chain of a polymer comprising a repeating unit represented by formula (II') shown below.

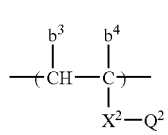

(II')

In formula (II'), $X^2$, $b^3$ and $b^4$ have the same meanings as $X^0$, $a^1$ and $a^2$ defined in formula (I), respectively.

$Q^2$ represents an aliphatic group having not less than 6 carbon atoms. The aliphatic group may have a substituent containing a fluorine atom and/or a silicon atom. When the substituent containing a silicon atom is present, the number of carbon atoms in the aliphatic group having not less than 6 carbon atoms may include the number of silicon atoms.

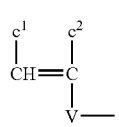

(III)

In formula (III), V represents —COO—, —OCO—, —(CH$_2$)$_k$—OCO—, —(CH$_2$)$_k$—COO—, —O—, —CONHCOO—, —CONHCO—, —SO$_2$—, —CO—, —CON(Z$^2$)—, —SO$_2$N(Z$^1$)— or a phenylene group (hereinafter, the phenyl group is represented by "—Ph—" and the "—Ph—" includes a 1,2-phenylene group, a 1,3-phenylene group and a 1,4-phenylene group).

$Z^1$ has the same meaning as $Z^1$ defined in formula (I) and represents a hydrogen atom or a hydrocarbon group, preferably represents a hydrogen atom, an alkyl group having from 1 to 18 carbon atoms, an alkenyl group, an aralkyl group, an alicyclic group or an aryl group, each of these groups maybe substituted.

$Z^2$ represents a hydrogen atom or a hydrocarbon group. The hydrocarbon group represented by $Z^2$ has the same meaning as that defined for $Z^1$ above.

k represents an integer of from 1 to 3.

$c^1$ and $c^2$, which may be the same or different, each represent a hydrogen atom, a halogen atom, a cyano group, a hydrocarbon group, —COO—$Z^3$ or —COO—$Z^3$ linked through a hydrocarbon group, in which $Z^3$ represents a hydrogen atom or a hydrocarbon group. The hydrocarbon group represented by $c^1$ or $c^2$, and the hydrocarbon group represented by $Z^3$ each has the same meaning as that defined for $Z^1$ above.

In formula (II'), the aliphatic group having not less than 6 carbon atoms represented by $Q^2$ is preferably a straight chain or branched aliphatic group having from 6 to 22 carbon atoms, which may have a substituent, for example, a halogen atom, a hydroxy group, an amino group or an alkoxy group, or may contain a hetero atom, for example, an oxygen atom, a sulfur atom or a nitrogen atom between the carbon atom-carbon atom bond in the main chain thereof. Specific examples of the aliphatic group include an octyl group, a decyl group, a dodecyl group, a tridecyl group, a tetradecyl group, a hexadecyl group, an octadecyl group, a docosyl group, a dodecenyl group, a hexadecenyl group, an oleyl group, a linoleyl group and a docosenyl group.

The aliphatic group may further have a substituent containing a fluorine atom and/or a silicon atom. Examples of the substituent containing a fluorine atom include the following monovalent or divalent organic residues: —C$_p$(F)$_{2p+1}$ (p represents an integer of from 1 to 22), —CFH$_2$, —CFHCl, —CFCl$_2$, —CF$_2$Cl, —(CF$_2$)$_q$CF$_2$H (q represents 0 or an integer of from 1 to 17), —CF$_2$—, —CFH— and —CFCl—.

The organic residues containing a fluorine atom may be used in combination. In such cases, they may be combined with each other directly or through other connecting group. The connecting group includes a divalent organic residue, for example, a divalent aliphatic residue or divalent aromatic residue that may contain a connecting group selected from —O—, —S—, —N(g$^1$)—, —CO—, —SO—, —SO$_2$—, —COO—, —OCO—, —CONHCO—, —NHCONH—, —CON(g$^1$)— and —SO$_2$N(g$^1$)— and an organic group composed of a combination of these divalent groups. $g^1$ represents an alkyl group having from 1 to 3 carbon atoms.

Examples of the substituent containing a silicon atom preferably include a residue containing a siloxane structure (or a silyloxy structure) or a silyl group. When the substituent containing a silicon atom is present, the number of carbon atoms in the aliphatic group having not less than 6 carbon atoms may include the number of silicon atoms.

Specific examples of the repeating unit represented by formula (II') wherein $Q^2$ represents an aliphatic group having from 6 to 22 carbon atoms, which includes a substituent containing a fluorine atom and/or a silicon atom, are set forth below, but the invention should not be construed as being limited thereto.

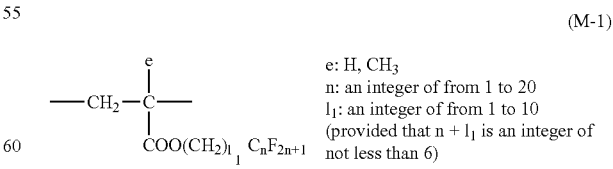

(M-1)

e: H, CH$_3$
n: an integer of from 1 to 20
l$_1$: an integer of from 1 to 10
(provided that n + l$_1$ is an integer of not less than 6)

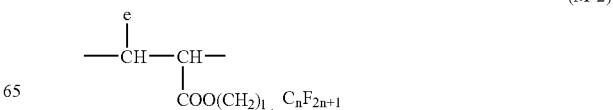

(M-2)

-continued

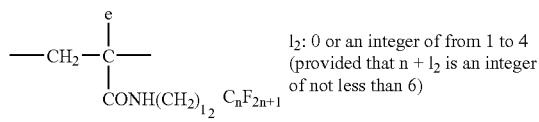
(M-3)

$l_2$: 0 or an integer of from 1 to 4
(provided that $n + l_2$ is an integer of not less than 6)

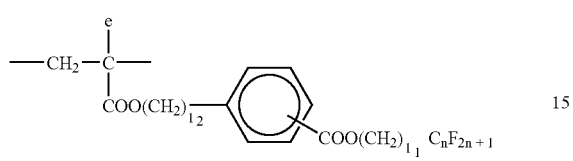
(M-4)

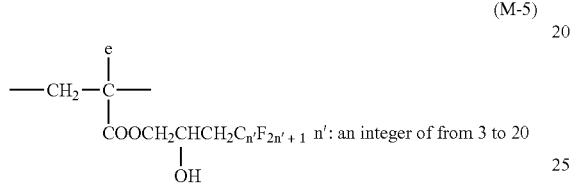
(M-5)

$n'$: an integer of from 3 to 20

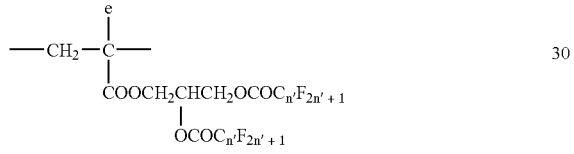
(M-6)

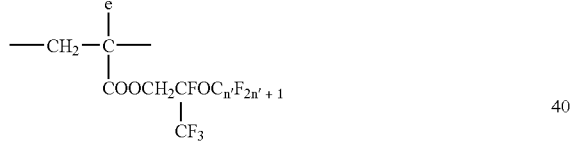
(M-7)

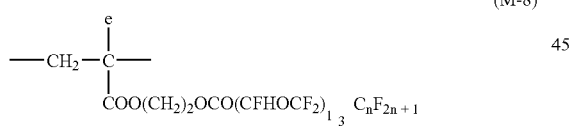
(M-8)

$l_3$: an integer of from 1 to 6
(provided that $l_3 + n$ is an integer of not less than 5)

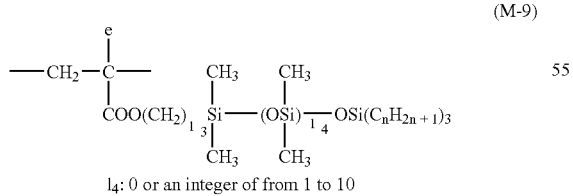
(M-9)

$l_4$: 0 or an integer of from 1 to 10

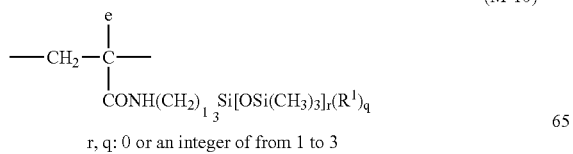
(M-10)

r, q: 0 or an integer of from 1 to 3

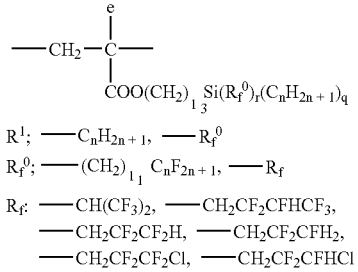
(M-11)

$R^1$: —$C_nH_{2n+1}$, —$R_f^0$
$R_f^0$: —$(CH_2)_{l_1}C_nF_{2n+1}$, —$R_f$
$R_f$: —$CH(CF_3)_2$, —$CH_2CF_2CFHCF_3$,
—$CH_2CF_2CF_2H$, —$CH_2CF_2CFH_2$,
—$CH_2CF_2CF_2Cl$, —$CH_2CF_2CFHCl$

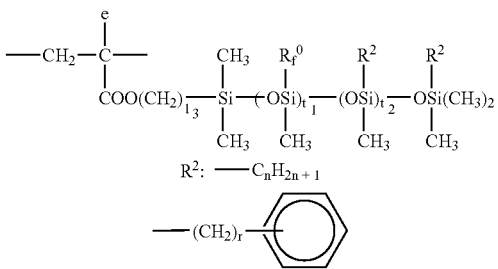
(M-12)

$R^2$: —$C_nH_{2n+1}$

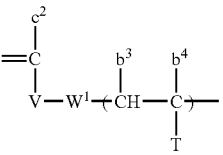

$t_1 + t_2 = 10$
$t_1$: 0 or an integer of from 1 to 4
$t_2$: 0 or an integer of from 1 to 10

Of the macromonomers (M) according to the invention, those represented by the following formula (IV) are preferred.

$$\overset{c^1}{CH}=\overset{c^2}{C}-V-W^1-(\overset{b^3}{CH}-\overset{b^4}{C})-T$$
(IV)

In formula (IV), $c^1$, $c^2$, $b^3$, $b^4$ and V have the same meanings as defined for those in the formulae (II') and (III), respectively.

T represents —$X^1$—$Q^1$ in formula (II) and $X^1$ and $Q^1$ have the same meanings as defined in formula (II), respectively.

$W^1$ represents a single bond, an individual connecting group selected from —C($Z^4$)($Z^5$)— (wherein $Z^4$ and $Z^5$ each represent a hydrogen atom, a halogen atom (for example, a fluorine atom, a chlorine atom or a bromine atom), a cyano group or a hydroxy group), —(CH=CH)—, a cyclohexylene group (hereinafter, the cyclohexylene group is represented by "—Cy—" and the "—Cy—" includes a 1,2-cyclohexylene group, a 1,3-cyclohexylene group and a 1,4-cyclohexylene group), —Ph—, —O—, —S—, —C(=O)—, —N($Z^6$), —COO—, —SO—, —CON($Z^6$)—, —SON($Z^6$)—, —NHCOO—, —NHCONH— and —Si($Z^6$)($Z^7$)— (wherein $Z^6$ and $Z^7$ each represent a hydrogen atom or a hydrocarbon group having the same meaning as defined for $Z^1$ described above), or a connecting group constituted by an appropriate combination of two or more thereof.

In formulae (II'), (III) and (IV), particularly preferred examples of $X^0$, V, $c^1$, $c^2$, $b^3$ and $b^4$ are described below, respectively.

$X^0$ includes one or more connecting groups selected from —COO—, —OCO—, —O—, —CH$_2$COO— and —CH$_2$OCO—; V includes all the groups described above (provided that $Z^1$ represents a hydrogen atom); and $c^1$, $c^2$, $b^3$ and $b^4$ include a hydrogen atom and a methyl group, respectively.

Specific examples of the moiety represented by CH($c^1$)=C($c^2$)—V—W$^1$— in the macromonomer of formula (IV) are set forth below, but the invention should not be construed as being limited thereto.

In the following examples, j represents an integer of from 1 to 12, k represents an integer of from 2 to 12, and a represents —H or —CH$_3$.

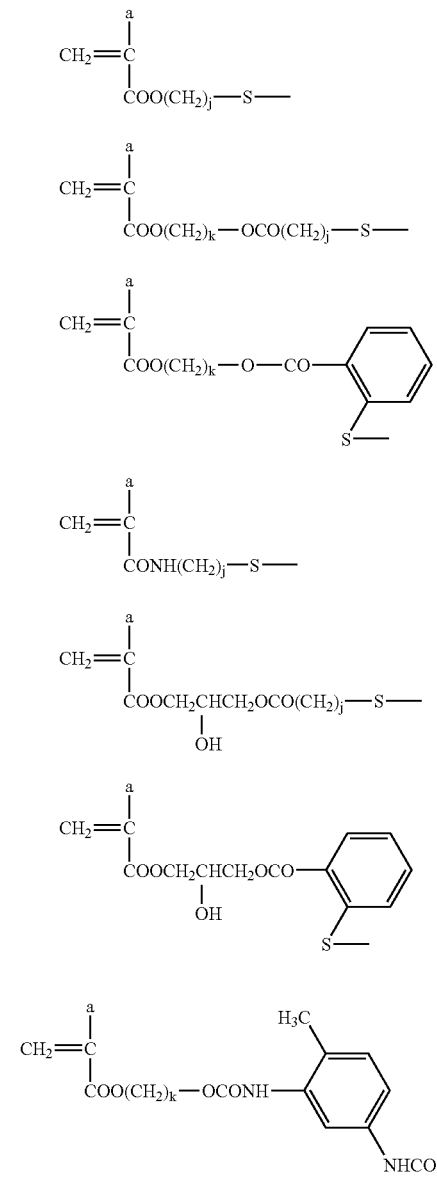
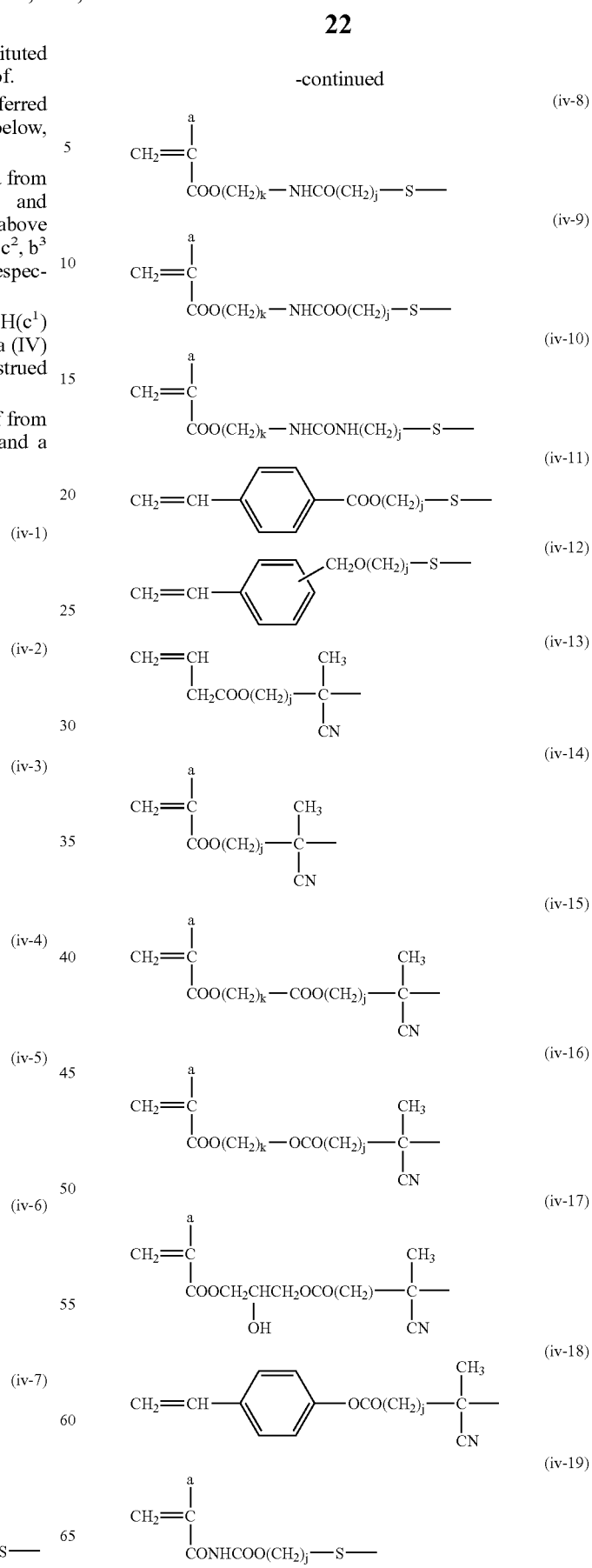

-continued

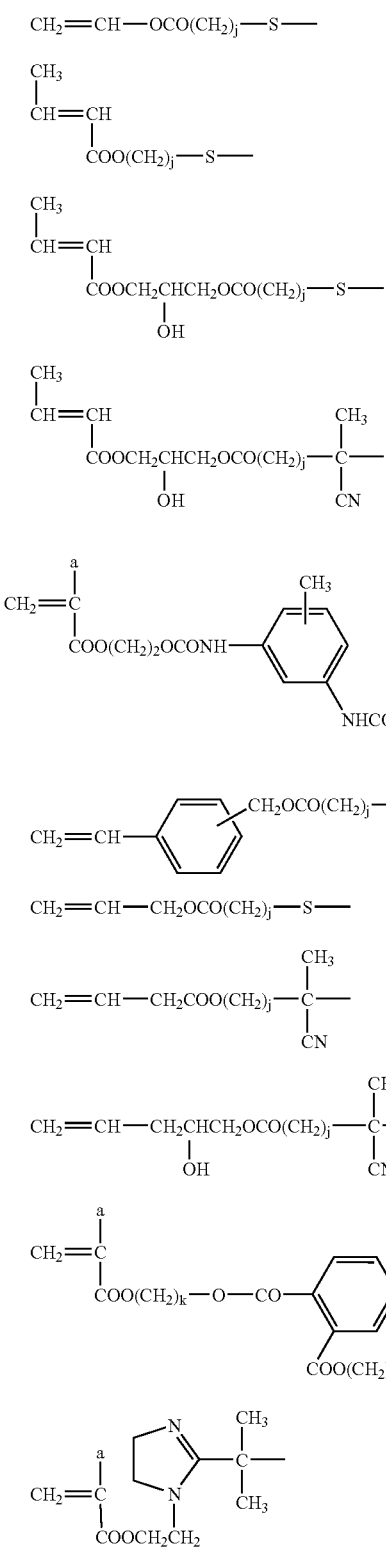

The macromonomer (M) for use in the invention can be produced by conventionally known synthesis methods. Examples thereof include (1) a method using ionic polymerization in which various reagents are reacted with a terminal of a living polymer obtained by anionic polymerization or cationic polymerization to form a macromonomer; (2) a method using radical polymerization in which various reagents are reacted with an oligomer having a terminal reactive group obtained by radical polymerization using a polymerization initiator and/or chain transfer agent containing a reactive group, for example, a carboxy group, a hydroxy group or an amino group in the molecule thereof, thereby forming a macromonomer; and (3) a method using polyaddition condensation in which a polymerizable double bond group is introduced into an oligomer obtained by a polyaddition or polycondensation reaction, in the same manner as in the above-described radical polymerization method.

Specifically, the macromonomer can be synthesized according to methods described, for example, in P. Dreyfuss and R. P. Quirk, *Encycl. Polym. Sci. Eng.*, Vol. 7, page 551 (1987), P. F. Rempp and E. Franta, *Adv. Polym. Sci.*, Vol. 58, page 1 (1984), V. Percec, *Appl. Polym. Sci.*, Vol. 285, page 95 (1984), R. Asami and M. Takagi, *Makromol. Chem. Suppl.*, Vol. 12, page 163 (1985), P. Rempp et al., *Makromol. Chem. Suppl.*, Vol. 8, page 3 (1987), Yusuke Kawakami, *Kagaku Kogyo*, Vol. 38, page 56 (1987), Tatsuya Yamashita, *Kobunshi*, Vol. 31, page 988 (1982), Shiro Kobayashi, *Kobunshi*, Vol. 30, page 625 (1981), Toshinobu Higashimura, *Nippon Setchaku Kyokaishi*, Vol. 18, page 536 (1982), Koichi Ito, *Kobunshi Kako*, Vol. 35, page 262 (1986), and Takashiro Azuma and Takashi Tsuda, *Kino Zairyo*, Vol. 1987, No. 10, page 5, and the literature references and patents cited therein.

The graft copolymer for the binder resin used in the invention may contain other monomer C2 together with the monofunctional monomer A containing an aliphatic cyclic hydrocarbon group having from 5 to 30 carbon atoms and the macromonomer (M), which is capable of copolymerizing with the monofunctional monomer A and is soluble in the non-aqueous dispersion medium.

The monomer C2 is any monomer as long as it is capable of copolymerizing with the monofunctional monomer A and the macromonomer (M).

Specific examples of the monomer C2 include those described for the monomer C1 used in the block copolymer for the binder resin described above.

The graft copolymer used as the binder resin in the invention comprises at least one repeating unit (a) corresponding to the monofunctional monomer A containing an aliphatic cyclic hydrocarbon group having from 5 to 30 carbon atoms in the main chain thereof and at least one repeating unit (b2) corresponding to the macromonomer (M), which is capable of copolymerizing with the monofunctional monomer A and is soluble in the non-aqueous dispersion medium in the graft portion (side chain) thereof. It is preferred that a content of the monomer A is from 30 to 95 parts by weight and a content of the macromonomer (M) is from 5 to 70 parts by weight based on 100 parts by weight of the graft copolymer.

More preferably, the content of the monomer A is from 40 to 90 parts by weight and the content of the macromonomer (M) is from 10 to 60 parts by weight. A content of the monomer C2 is preferably not more than 50 parts by weight, and more preferably not more than 40 parts by weight based on 100 parts by weight of the graft copolymer.

The binder resin for use in the invention comprises the above-described specific block copolymer or graft copolymer and it may contain other resin. When other resin is used together, it is preferred that the content thereof is not more than 30% by weight based on the total amount of binder resin.

A non-aqueous dispersion medium that is used in the oil based ink composition for inkjet printer according to the invention is a non-polar insulating solvent and preferably has a dielectric constant of from 1.5 to 20 and a surface tension of from 15 to 60 mN/mat 25° C. Characteristics further desired for the non-aqueous dispersion medium include that toxicity is low, that flammability is low and that odor is low.

The non-aqueous dispersion media include solvents selected from straight chain or branched aliphatic hydrocarbons, alicyclic hydrocarbons, aromatic hydrocarbons, petroleum naphthas and halogen-substituted products thereof. Examples thereof include hexane, octane, isooctane, decane, isodecane, decalin, nonane, dodecane, isododecane, Isopar E, Isopar G, Isopar H and Isopar L (manufactured by Exxon Chemical Co.), Solutol (manufactured by Phillips Petroleum Co.), IP Solvent (manufactured by Idemitsu Petrochemical Co., Ltd.), and peptroleum naphthas including S.B.R., Shellsol 70 and Shellsol 71 (manufactured by Shell Petrochemical Co., Ltd.) and Vegasol (manufactured by Mobil Oil Corp.). The solvents can be used individually or as a mixture thereof.

The hydrocarbon solvents are preferably high-purity isoparaffinic hydrocarbons having a boiling point in the range of from 150 to 350° C. Examples of commercially available products include Isopar G, Isopar H, Isopar L, Isopar M and Isopar V (trade names, manufactured by Exxon Chemical Co.), Norpar 12, Norpar 13 and Norpar 15 (trade names, manufactured by Exxon Chemical Co.), IP Solvent 1620 and IP Solvent 2028 (trade names, manufactured by Idemitsu Petrochemical Co., Ltd.), Isosol 300 and Isosol 400 (trade names, manufactured by Nippon Petrochemicals Co., Ltd.), and Amsco OMS and Amsco 460 solvents (trade names, manufactured by American Mineral Spirits Corp.). These products are composed of an aliphatic saturated hydrocarbon having an extremely high purity, and have a viscosity of 3 cSt or less at 25° C., a surface tension of from 22.5 to 28.0 mN/m at 25° C., and a volume resistivity $10^{10}$ Ω·cm or more at 25° C. of. Further, these products have characteristics in that they are stable due to low reactivity and highly safe due to low toxicity and in that their odors are low.

The halogen-substituted hydrocarbon solvents include fluorocarbon solvents. Examples thereof include perfluoroalkanes represented by $C_nF_{2n+2}$, for example, $C_7F_{16}$ and $C_8F_{18}$ (for example, Fluorinert PF5080 and Fluoriner PF5070 (trade names, manufactured by Sumitomo 3M Ltd.)), fluorine based inert liquids (for example, Fluorinert FC Series (trade names, manufactured by Sumitomo 3M Ltd.)), fluorocarbons (for example, Krytox GPL Series (trade names, manufactured by DuPont Japan Ltd.)), fleons (for example, HCFC-141b (a trade name, manufactured by Daikin Industries, Ltd.), and iodinated fluorocarbons, for example, $F(CF_2)_4CH_2CH_2I$ and $F(CF_2)_6I$ (for example, I-1420 and I-1600 (trade names, manufactured by Daikin Fine Chemical Laboratory, Ltd.).

As the non-aqueous solvent that is used in the invention, higher fatty acid esters and silicone oils can also be used. Specific examples of the silicone oil include low-viscosity synthetic dimethylpolysiolxanes, which are commercially available, for example, KF96L (a trade name, manufactured by Shin-Etsu Silicones) and SH200 (a trade name, manufactured by Dow Corning Toray Silicone Co., Ltd.).

The silicone oils are not limited to these specific examples. As the dimethylpolysiloxanes, those having a very broad viscosity range are available depending on the molecular weight, but those having a viscosity in the range of from 1 to 20 cSt at 25° C. are preferably used. Similar to the isoparaffinic hydrocarbons, the dimethylpolysiloxanes have a volume resistivity of $10^{10}$ Ω·cm or more at 25° C. and have characteristics, for example, high stability, high safety and odorlessness. Further, the dimethylpolysiloxanes are characterized by having a low surface tension, i.e., the surface tension of from 18 to 21 mN/m at 25° C.

Examples of solvent that can be used together with the above-described non-aqueous dispersion medium include alcohols (for example, methyl alcohol, ethyl alcohol, propyl alcohol, butyl alcohol or fluorinated alcohol), ketones (for example, acetone, methyl ethyl ketone or cyclohexanone), carboxylic acid esters (for example, methyl acetate, ethyl acetate, propyl acetate, butyl acetate, methyl propionate or ethyl propionate), ethers (for example, diethyl ether, dipropyl ether, tetrahydrofuran or dioxane), and halogenated hydrocarbons (for example, methylene dichloride, chloroform, carbon tetrachloride, dichloroethane or methylchloroform).

Now, the coloring agent for use in the invention will be described in detail below.

The coloring agent used in the invention is not particularly restricted and includes any of ordinarily commercially available organic pigments and inorganic pigments.

Examples of the coloring agents that exhibit yellow color include monoazo pigments, for example, C.I. Pigment Yellow 1 (Fast Yellow G, etc.) and C.I. Pigment Yellow 74; disazo pigments, for example, C.I. Pigment Yellow 12 (Disazo Yellow AAA, etc.) and C.I. Pigment Yellow 17; non-benzidine based azo pigments, for example, C.I. Pigment Yellow 180; azo lake pigments, for example, C.I. Pigment Yellow 100 (Tartrazine Yellow Lake, etc.); condensed azo pigments, for example, C.I. Pigment Yellow 95 (Condensed Azo Yellow GR, etc.); acidic dye lake pigments, for example, C.I. Pigment Yellow 115 (Quinoline Yellow Lake, etc.); basic dye lake pigments, for example, C.I. Pigment Yellow 18 (Thioflavin Lake, etc.); anthraquinone based pigments, for example, Flavanthrone Yellow (Y-24); isoindolinone pigments, for example, Isoindolinone Yellow 3RLT (Y-110); quinophthalone pigments, for example, Quinophthalone Yellow (Y-138); isoindoline pigments, for example, Isoindoline Yellow (Y-139); nitroso pigments, for example, C.I. Pigment Yellow 153 (Nickel Nitroso Yellow, etc.); and metal complex azomethine pigments, for example, C.I. Pigment Yellow 117 (Copper Azomethine Yellow, etc.).

Examples of the coloring agents that exhibit magenta color include monoazo pigments, for example, C.I. Pigment Red 3 (Toluidine Red, etc.); disazo pigments, for example, C.I. Pigment Red 38 (Pyrazolone Red B, etc.); azo lake pigments, for example, C.I. Pigment Red 53:1 (Lake Red C, etc.) and C.I. Pigment Red 57:1 (Brilliant Carmine 6B); condensed azo pigments, for example, C.I. Pigment Red 144 (Condensed Azo Red BR, etc.); acidic dye lake pigments, for example, C.I. Pigment Red 174 (Phloxine B Lake, etc.); basic dye lake pigments, for example, C.I. Pigment Red 81 (Rhodamine 6G' Lake, etc.); anthraquinone based pigments, for example, C.I. Pigment Red 177 (Dianthraquinonyl Red, etc.); thioindigo pigments, for example, C.I. Pigment Red 88 (for example, Thioindigo Bordeaux, etc.); perinone pigments, for example, C.I. Pigment Red 194 (Perinone Red, etc.); perylene pigments, for example, C.I. Pigment Red 149 (Perylene Scarlet, etc.); quinacridone pigments, for example, C.I. Pigment Red 122 (Quinacridone Magenta, etc.); isoindolinone pigments, for example, C.I. Pigment Red 180 (Isoindolinone Red 2BLT, etc.); and arizalin lake pigments, for example, C.I. Pigment Red 83 (Madder Lake, etc.).

Examples of the coloring agents that exhibit cyan color include disazo pigments, for example, C.I. Pigment Blue 25 (Dianisidine Blue, etc.); phthalocyanine pigments, for example, C.I. Pigment Blue 15 (Phthalocyanine Blue, etc.); acidic dye lake pigments, for example, C.I. Pigment Blue 24 (Peacock Blue Lake, etc.); basic dye lake pigments, for example, C.I. Pigment Blue 1 (Victoria Pure Blue BO Lake, etc.); anthraquinone based pigments, for example, C.I. Pigment Blue 60 (Indanthrone Blue, etc.); and alkali blue pigments, for example, C.I. Pigment Blue 18 (Alkali Blue V-5:1).

Examples of the coloring agents that exhibit black color include organic pigments, for example, aniline black based pigments such as BK-1 (Aniline Black), iron oxide pigments, and carbon black pigments, for example, furnace black, lamp black, acetylene black and channel black.

Specific examples of the carbon black pigment include MA-8, MA-10, MA-11, MA-100, MA-220, #25, #40, #260, #2600, #2700B, #3230B, CF-9 and MA-200RB (manufactured by Mitsubishi Chemical Corp.), Printex 75 and Printex 90 (manufactured by Degussa AG), and Monarch 800 and Monarch 1100 (manufactured by Cabot Corp.).

Also, metallic powder is employable for attaining color reproduction, for example, gold, silver or copper color.

The coloring agents for use in the invention are preferably those subjected to surface treatment according to the methods described in *Pigment Dispersing Technologies*, Chapter 5, Gijutsu Joho Kyokai Co., Ltd in order to easily make it fine particle and to improve dispersibility. Examples of the surface treatment of coloring agent include rosin treatment and flushing resin treatment. Further, ordinarily commercially available processed pigment can be used as the coloring agent. Specific examples of the commercially available processed pigment include Microlith pigments manufactured by Ciba Specialty Chemicals.

With respect to amounts of the coloring agent and the binder resin, the binder resin is used in an amount of from 0.3 to 10 parts by weight based on one part by weight of the coloring agent. Preferably, the binder resin is used in an amount of from 0.4 to 7 parts by weight based on one part by weight of the coloring agent. More preferably, the binder resin is used in an amount of from 0.5 to 5 parts by weight based on one part by weight of the coloring agent. The use of binder resin in an amount of less than 0.3 parts by weight based on one part by weight of the coloring agent is not preferable because of decrease in the effect for dispersing coloring agent at the kneading. On the other hand, when the amount of binder resin used is more than 10 parts by weight based on one part by weight of the coloring agent, the coloring agent concentration in the ink composition decreases to cause reduction of image density so that the desired color density cannot be obtained.

The oil based ink composition for inkjet printer of the invention contains the binder resin and coloring agent described above as the main components. In the oil based ink composition, it is preferred that the coloring agent is dispersed (admixed) in the binder resin and as a result the coloring agent is coated with the binder resin.

Now, methods for coating the coloring agent with the binder resin comprising the block copolymer or the graft copolymer to prepare a colored admixture are described below. The colored admixture is prepared by the following methods:

(1) Method wherein the coloring agent and the binder resin are molten and kneaded at a temperature not lower than a softening point of the binder resin using a kneading machine, for example, a roll mill, a Banbury mixer or a kneader, and after cooling, the mixture is pulverized, thereby obtaining the colored admixture.

(2) Method wherein the binder resin is dissolved in a solvent, the coloring agent is added to the solution, the mixture is subjected to wet type dispersion by a machine, for example, a ball mill, an attritor or a sand grinder, and the resulting dispersion is dried by evaporating the solvent, thereby obtaining the colored admixture, or the dispersion is poured into a non-solvent for the binder resin to precipitate an admixture, followed by drying, thereby obtaining the colored admixture.

(3) Method wherein a water-containing paste (wet cake) of the coloring agent is kneaded together with the binder resin or a solution of the binder resin by a flushing method to substitute the water with the binder resin or the solution of the binder resin, and the mixture is dried by removing the water and the solvent under a reduced pressure, thereby obtaining the colored admixture.

The colored admixture is dispersed in the non-aqueous dispersion medium in fine particulate state according to a step of dispersion.

It is preferred in the invention to use a dispersant for pigment in the dispersion step in order to disperse the colored admixture in the fine particulate state and to stabilize the colored admixture in the non-aqueous dispersion medium.

A method of using the colored admixture and the dispersant for pigment includes, for example, the following methods, and any one of these methods can achieve the desired effects.

1. A colored composition obtained by previously mixing the colored admixture with the dispersant for pigment is added and dispersed in the non-aqueous dispersion medium.
2. The colored admixture and the dispersant for pigment are individually added and dispersed in the non-aqueous dispersion medium.
3. Dispersions obtained by separately dispersing the colored admixture and the dispersant for pigment in the non-aqueous dispersion medium are mixed with each other.
4. The colored admixture is dispersed in the non-aqueous dispersion medium and then the dispersant for pigment is added to the resulting colored admixture dispersion.

A machine used for conducting the mixing or dispersion of colored admixture in the non-aqueous dispersion medium includes, for example, a dissolver, a high-speed mixer, a homomixer, a kneader, a ball mill, a roll mill, a sand mill and an attritor.

As the dispersant for pigment for dispersing the colored admixture in the fine particulate state in the non-aqueous dispersion medium, which can be used in the invention, conventional dispersants for pigment applied to the non-aqueous dispersion medium are employed. Any dispersants for pigment can be used as long as they are compatible with the above-described non-polar insulating solvent and can stably disperse the coloring agent in the fine particulate state. Specific examples of the dispersant for pigment include nonionic surfactants, for example, sorbitan fatty acid esters (e.g., sorbitan monooleate, sorbitan monolaurate, sorbitan sesquioleate or sorbitan trioleate), polyoxyethylene sorbitan fatty acid esters (e.g., polyoxyethylene sorbitan monostearate or polyoxyethylene sorbitan monooleate), polyethylene glycol fatty acid esters (e.g., polyethylene glycol monostearate or polyethylene glycol diisostearate), polyoxyethylene alkylphenyl ethers (e.g., polyoxyethylene nonylphenyl ether or polyoxyethylene octylphenyl ether), and aliphatic diethanolamides. Further, as high-molecular dispersants for pigment, high-molecular compounds having a molecular weight of 1,000 or more are preferably used. Examples thereof include styrene-maleic acid resins, styrene-acrylic resins, rosins, BYK-160, BYK-162, BYK-164 and BYK-182 (urethane based high-molecular compounds manufactured by BYK-Chemie), EFKA-47 and LP-4050 (urethane based dispersants manufactured by EFKA), Solsperse 24000 (polyester based high-molecular compound manufactured by Zeneca, Inc), and Solsperse 17000 (aliphatic diethanolamide based high-molecular compound manufactured by Zeneca, Inc).

Other examples of the high-molecular dispersant for pigment include random copolymers comprising a monomer that solvates with the dispersion medium (for example, lauryl methacrylate, stearylmethacrylate, 2-ethylhexyl methacrylate or cetyl methacrylate), a monomer that hardly solvates with the dispersion medium (for example, methyl methacrylate, ethyl methacrylate, isopropylmethacrylate, styrene or vinyltoluene) and a polar group-containing monomer, and the graft copolymers as described in JP-A-3-188469. The block copolymer or the graft copolymer according to the invention may also be used as the dispersant for pigment.

Examples of the polar group-containing monomer include an acidic group-containing monomer, for example, acrylic acid, methacrylic acid, itaconic acid, fumaric acid, maleic acid, styrenesufonic acid or an alkali metal salt thereof, and a basic group-containing monomer, for example, dimethylamonoethyl methacrylate, diethylaminoethyl methacrylate, vinylpyridine, vinylpyrrolidine, vinylpiperidine or vinyllactam. In addition, styrene-butadiene copolymers and the block copolymers of styrene and a long chain alkyl methacrylate as described in JP-A-60-10263 are enumerated. Preferred examples of the dispersant for pigment include the graft copolymers described in JP-A-3-188469.

An amount of the dispersant for pigment used is preferably from 0.1 to 300 parts by weight based on 100 parts by weight of the colored admixture. When the amount of dispersant for pigment added is less than 0.1 parts by weight, the effect for dispersion unpreferably decreases. On the other hand, even when the dispersant for pigment is used more than 300 parts by weight, no further improving effect is achieved.

An average particle size of the colored admixture in the non-aqueous dispersion medium is preferably in a range of from 0.01 to 0.5 μm, and more preferably in a range of from 0.05 to 0.3 μm. The maximum particle size thereof is preferably not more than 1 μm, and more preferably not more than 0.7 μm.

The term "particle size" as used herein means a particle size measured by an ultra-centrifugal automatic particle size distribution analyzer (CAPA700 manufactured by Horiba, Ltd.) The ink composition of the invention may contain various additives, if desired. The additives to be added to the ink composition are appropriately selected depending on the ink-jet system and the material and structure of inkjet ejection head, ink supply portion and ink circulation portion. Examples of the additives are described, for example, in Takeshi Amari supervised, *Inkjet Printer—Techniques and Materials*, Chapter 17, CMC Publishing Co., Ltd. (1998).

Specific examples thereof include fatty acids (for example, monocarboxylic acid and polybasic acid each having from 6 to 32 carbon atoms, e.g., dodecenylsuccinic acid, butylsuccinic acid, 2-ethylcaproic acid, lauric acid, palmitic acid, elaidic acid, linoreic acid, ricinoleic acid, oleic acid, stearic acid, enanthic acid, naphthenic acid, ethylenediaminetetraacetic acid, abietic acid, tetrahydroabietic acid or hydrogenated rosin), metal salts of resin acid, alkylphthalic acid or alkyl salicylic acid (examples of metal of the metal ion include Na, K, Li, B, AL, Ti, Ca, Pb, Mn, Co, Zn, Mg, Ce, Ag, Zr, Cu, Fe or Ba), surface active compounds (for example, organic phosphoric acid and salt thereof, e.g., mono-, di- or tri-alkyl phosphate wherein the alkyl group has from 3 to 18 carbon atoms, organic sulfonic acid and salt thereof, e.g., long chain aliphatic sulfonic acid, long chain alkylbenzene sulfonic acid, dialkylsulfosuccinic acid or salts thereof, or amphoteric surface active compound, for example, phosphoripide, e.g., lecithin or cephalin), surfactants having a fluorine atom and/or dialkylsiloxane bond-containing alkyl group, aliphatic alcohols (for example, higher alcohol containing a branched alkyl group having from 9 to 20 carbon atoms, benzyl alcohol, phenethyl alcohol or cyclohexyl alcohol), polyhydric alcohols (for example, alkylene glycol having from 2 to 18 carbon atoms, e.g., ethylene glycol, 1,2-propylene glycol, 1,3-propylene glycol, 1,4-butanediol, neopentyl glycol, 1,6-hexanediol or dodecanediol), alkylene ether glycols having from 4 to 1,000 carbon atoms (for example, diethylene glycol, triethylene glycol, dipropylene glycol, polyethylene glycol, polypropylene glycol or polytetramethylene ether glycol), alicyclic diols having from 5 to 18 carbon atoms (for example, 1,4-cyclohexanedimethanol or hydrogenated bisphenol A), adducts of alkylene oxide having from 2 to 18 carbon atoms (for example, ethylene oxide, propylene oxide, butylene oxide or α-olefin oxide) with bisphenol having from 12 to 23 carbon atoms (for example, bisphenol A, bisphenol F or bisphenol S), polyols (for example, glycerol, trimethylolethane, trimethylolpropane, pentaerythritol or sorbitol), phenols of three or higher valence (for example, trisphenol PA, phenol novolac or cresol novolac), adducts of alkylene oxide having from 2 to 18 carbon atoms with the above-described polyphenols of three or higher valence (addition molar number: 2 to 20), ether derivatives of the above-described polyhydric alcohol (for example, polyglycol alkyl ether or alkylaryl polyglycol ether), fatty acid ester derivatives of polyhydric alcohol, ether oleate derivatives of polyhydric alcohol (for example, ethylene glycol monoethyl acetate, diethylene glycol monobutyl acetate, propylene glycol monobutyl propionate or sorbitane monomethyl dioxalate), alkylnaphthalenesulfonate, and alkylarylsulfonate, but the invention should not be construed as being limited thereto.

It is preferred that the amounts of various additives are controlled so that the ink composition has a surface tension of from 15 to 60 mN/m and viscosity of from 1.0 to 40 cp at 25° C.

The method for the production of ink composition according to the invention is not particularly restricted to those described above, and any method of mixing the above-described specific binder resin and the coloring agent can be employed. In particular, it is preferred that the method includes a step of coating the coloring agent with the binder resin in an appropriate manner and a step of dispersing the colored admixture comprising the coloring agent coated with the binder resin in the non-aqueous dispersion medium.

The oil based ink composition for inkjet printer can be used as oil based ink in various inkjet recording systems. The inkjet recording systems include, for example, a piezoelectric system, inkjet printers of electrostatic system as typified by slit jet of Toshiba Corp. or NTT Corp., etc. and inkjet printers of thermal system.

Preparation examples of the binder resin and examples of the invention will be described below, but the invention should not be construed as being limited thereto.

PREPARATION EXAMPLE 1 OF BLOCK COPOLYMER FOR BINDER RESIN

Binder Resin (BP-1)

A mixture of 100 g of hexadecyl methacrylate as Monomer B1, 4.5 g of Initiator (I-1) having the structure shown below and 100 g of tetrahydrofuran was heated to a temperature of 50° C. under nitrogen gas stream. The solution was irradiated with light from a high-pressure mercury lamp of 400 W at a distance of 10 cm through a glass filter for 8 hours to conduct photopolymerization. The resulting polymerization product was reprecipitated in one liter of methanol, and the precipitate was collected and dried.

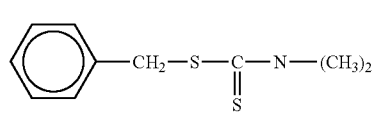

Initiator (I-1)

A mixed solution of 40 g of the polymer obtained above, 60 g of isobornyl methacrylate having the structure shown below as Monomer A and 100 g of tetrahydrofuran was heated to a temperature of 50° C. under nitrogen gas stream. The solution was irradiated with light in the same manner as above for 16 hours. The resulting reaction product was reprecipitated in 1.5 liters of methanol, and the precipitate was collected and dried. The yield of the white powder obtained was 88 g. The weight average molecular weight (Mw) thereof was $5.5 \times 10^4$. The weight average molecular weight was measured by a GPC method and calculated in terms of polystyrene (hereinafter the same).

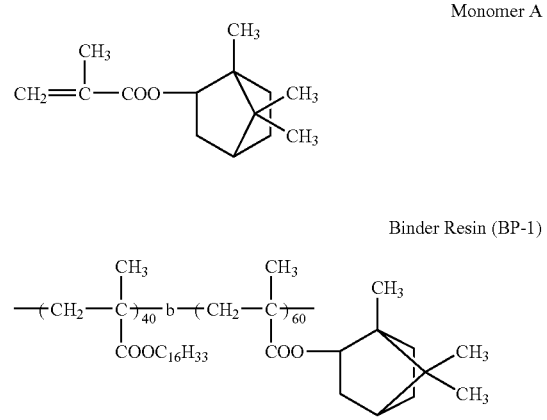

(—b—represents a bond between blocks)

PREPARATION EXAMPLES 2 TO 20 OF BLOCK COPOLYMER FOR BINDER RESIN

Binder Resins (BP-2) to (BP-20)

Binder Resins (BP-2) to (BP-20) were prepared in the same manner as in Preparation Example 1 of Block Copolymer for Binder Resin except for using monomers corresponding to the components of resins described in Table A below in place of hexadecyl methacrylate as Monomer B1 and isobornyl methacrylate as Monomer A, respectively. The weight average molecular weight (Mw) of each of the block copolymers was in a range of from $1.2 \times 10^4$ to $9.5 \times 10^4$.

TABLE A

| Preparation Example of Binder Resin | Binder Resin | Chemical Structure of Binder Resin (ratio of monomers: by weight) |
|---|---|---|
| 2 | BP-2 | —(CH$_2$—C(CH$_3$)(C(=O)O—C$_{18}$H$_{37}$))$_{20}$—b—(CH$_2$—C(CH$_3$)(C(=O)O-cyclohexyl))$_{80}$— |
| 3 | BP-3 | —(CH$_2$—C(CH$_3$)(C(=O)O—C$_{18}$H$_{37}$))$_{20}$—b—(CH$_2$—C(CH$_3$)(C(=O)O-bornyl))$_{80}$— |

TABLE A-continued
| Preparation Example of Binder Resin | Binder Resin | Chemical Structure of Binder Resin (ratio of monomers: by weight) |
|---|---|---|
| 4 | BP-4 | 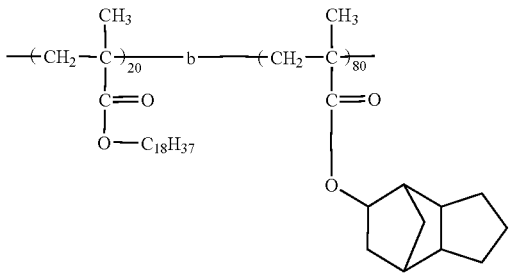 |
| 5 | BP-5 | 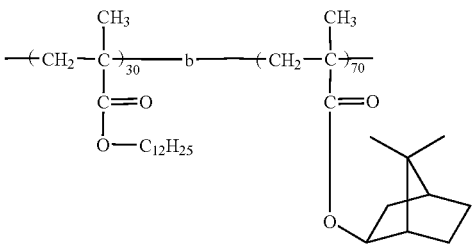 |
| 6 | BP-6 | 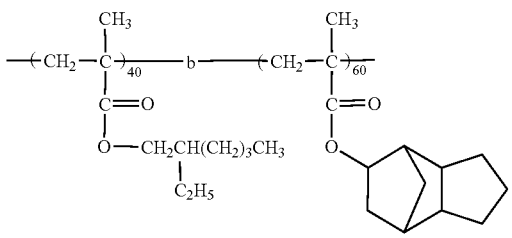 |
| 7 | BP-7 | 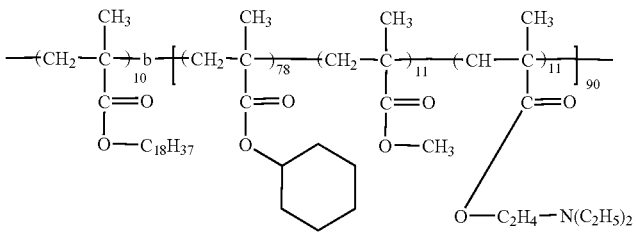 |
| 8 | BP-8 | 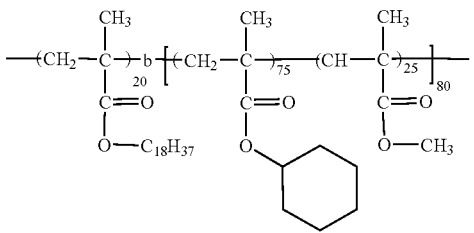 |
| 9 | BP-9 | 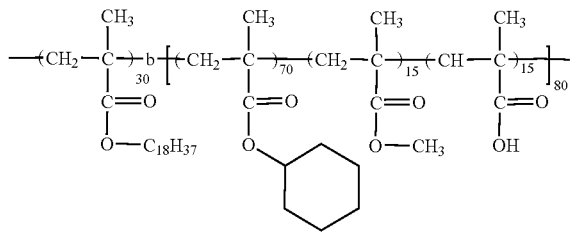 |

TABLE A-continued
| Preparation Example of Binder Resin | Binder Resin | Chemical Structure of Binder Resin (ratio of monomers: by weight) |
|---|---|---|
| 10 | BP-10 | 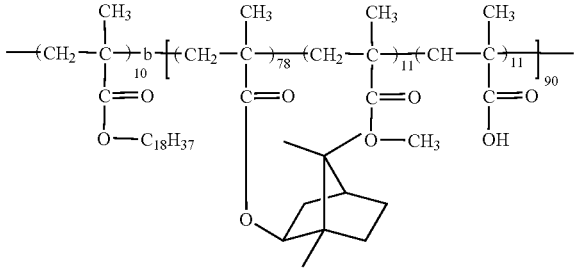 |
| 11 | BP-11 | 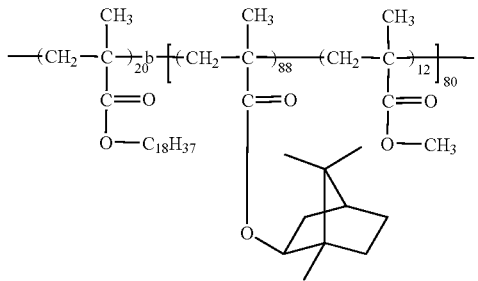 |
| 12 | BP-12 | 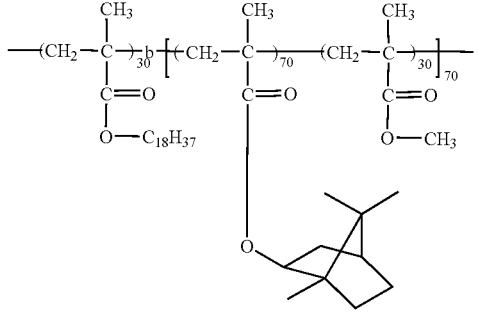 |
| 13 | BP-13 | 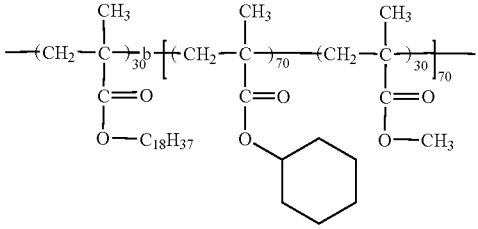 |
| 14 | BP-14 | 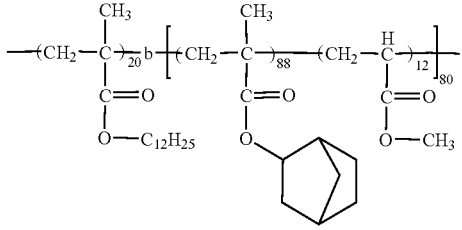 |

TABLE A-continued
| Preparation Example of Binder Resin | Binder Resin | Chemical Structure of Binder Resin (ratio of monomers: by weight) |
|---|---|---|
| 15 | BP-15 | 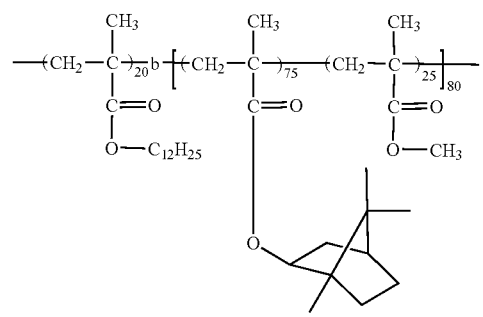 |
| 16 | BP-16 | 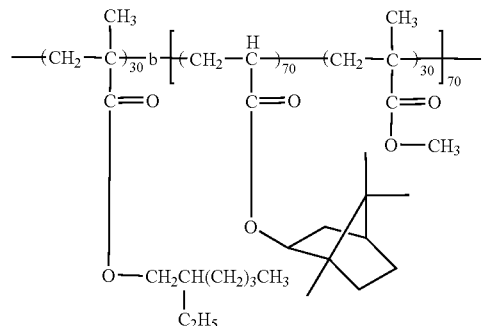 |
| 17 | BP-17 | 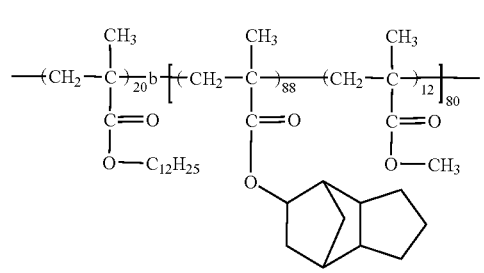 |
| 18 | BP-18 | 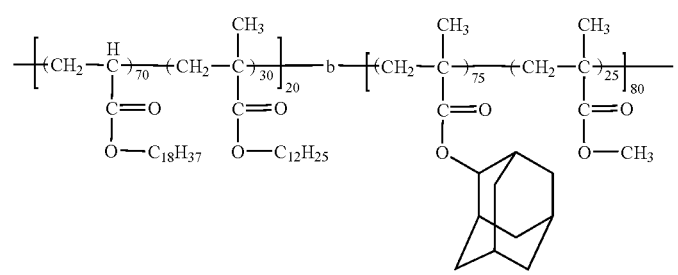 |
| 19 | BP-19 | 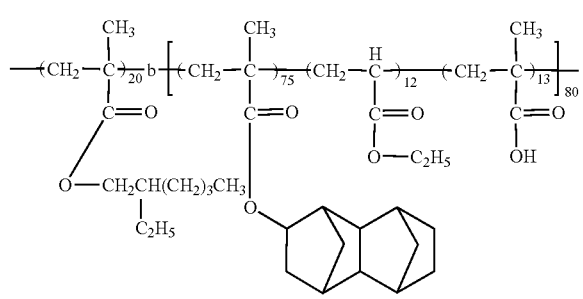 |

TABLE A-continued

| Preparation Example of Binder Resin | Binder Resin | Chemical Structure of Binder Resin (ratio of monomers: by weight) |
|---|---|---|
| 20 | BP-20 | $-\!\!\left[\!(CH_2\!-\!C(CH_3)\!)_{20}\,b\!-\![(CH_2\!-\!C(CH_3))_{75}\,(CH_2\!-\!C(CH_3))_{12}\,(CH_2\!-\!C(CH_3))_{13}]_{80}\!\right]\!-$ with pendant groups: $C(=O)O-C_{18}H_{37}$; $C(=O)O-$cyclohexyl(isopropyl); $C(=O)O-CH_3$; $C(=O)O-C_2H_4-N(C_2H_5)_2$ |

PREPARATION EXAMPLE 1 OF COMPARATIVE BINDER RESIN

Comparative Binder Resin (R-1)

A mixed solution of 80 g of methyl methacrylate, 20 g of stearyl methacrylate and 200 g of toluene was heated at a temperature of 80° C. with stirring under in a nitrogen gas stream for one hour. To the mixed solution was added 1.0 g of 2,2'-azobis(isobutyronitrile) (abbreviated as AIBN) as a polymerization initiator, followed by reacting for 4 hours. Then, 1.0 g of AIBN was added thereto, followed by reacting for 2 hours, and further 0.5 g of AIBN was added thereto, followed by reacting for 2 hours. After cooling, the mixed solution was reprecipitated in 5 liters of methanol to obtain Comparative Binder Resin (R-1). The weight average molecular weight (Mw) thereof was $3.3 \times 10^4$.

PREPARATION EXAMPLES 2 AND 3 OF COMPARATIVE BINDER RESIN

Comparative Binder Resins (R-2) and (R-3)

Comparative Binder Resins (R-2) and (R-3) were prepared in the same manner as in Preparation Example 1 of Comparative Binder Resin (R-1) except for using the monomers described in Table B below in place of 80 g of methyl methacrylate and 20 g of stearyl methacrylate, respectively. The weight average molecular weights (Mw) of the comparative binder resins were $2.6 \times 10^4$ and $3.1 \times 10^4$, respectively.

TABLE B

| Preparation Example of Comparative Binder Resin | Comparative Binder Resin | Comparative Monomer |
|---|---|---|
| 2 | R-2 | Benzyl methacrylate 80 g SMA 20 g |
| 3 | R-3 | Benzyl methacrylate 60 g SMA 20 g MMA 20 g |

In Table B, the abbreviates indicates the monomers respectively, as follows:

SMA: Stearyl methacrylate
MMA: Methyl methacrylate

EXAMPLE 1

Ink Composition (IJ-1)

A mixture of 100 parts by weight of Linol Red 6B FG-4213 (Pigment Red 57:1, manufactured by Toyo Ink Mfg. Co., Ltd.) as red pigment and 100 parts by weight of Binder Resin (BP-1) was preliminary pulverized and well mixed in a trio blender, and then melt-kneaded in a three-roll mill heated at 90° C. for 20 minutes. The kneaded pigment mixture was pulverized in a pin mill.

A mixture of 10 parts by weight of the resulting kneaded pigment mixture, 65 parts by weight of isoparaffinic hydrocarbon (Isopar G (trade name) manufactured by Exxon Chemical Co., hereinafter abbreviated as Isopar G) and 25 parts by weight of a 20 wt % solution prepared by dissolving Dispersant for Pigment (D-1) having the structure shown below in Isopar G by heating was blended together with 250 parts by weight of glass beads (3G-X) in a paint shaker (manufactured by Toyo Seiki Co., Ltd.) for 90 minutes. The volume average particle size of pigment resin particles in the resulting dispersion was measured by an ultra-centrifugal automatic particle size distribution analyzer (CAPA700 manufactured by Horiba, Ltd.) and found to be 0.18 μm, and the pigment resin particles were well dispersed.

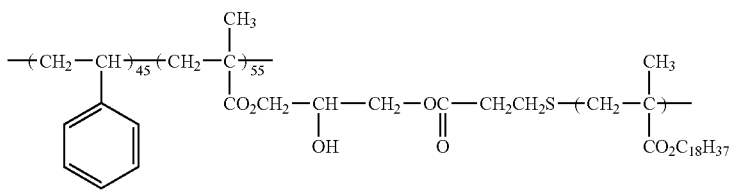

Dispersant for Pigment (D-1)

After removing the glass beads by filtration, the above-described dispersion of pigment resin particles was once concentrated by solvent distillation and then diluted with Isopar G to prepare Ink Composition (IJ-1). The ink composition has a concentration of the pigment resin particles of 16 wt %, a viscosity of 10 cp (measured by an E type viscometer at a temperature of 25° C., hereinafter the same) and a surface tension of 23 mN/m (measured by an automatic surface tensiometer manufactured by Kyowa Interface Science Co., Ltd. at a temperature of 25° C., hereinafter the same).

Ink Composition (IJ-1) was charged in a color facsimile (SAIYUKI UX-E1CL manufactured by Sharp Corp.) as an ink-jet recording device, and an image was drawn on an exclusive use paper of inkjet paper high-grade manufactured by Fuji Photo Film Co., Ltd. As a result, the discharge was stably conducted without causing nozzle clogging. The resulting drawn image was good and clear without blur and the image density thereof was 1.5. Further, a solid pattern was printed, and after drying the print, the solid image portion thereof was rubbed by fingers. As a result, lack of image was not observed at all, so that it was found that the scratch resistance was extremely excellent. The ink composition was free from aggregation and precipitation and extremely good in dispersibility even after the preservation for a long period of time.

The evaluation criteria of the ink composition are described below.

<Dispersion Stability of Ink>

After the preparation, the ink composition was allowed to stand at a temperature of 35° C. for one month. A container of the ink composition was shaken by hand several times and particle size (measured by the ultra-centrifugal automatic particle size distribution analyzer CAPA700 manufactured by Horiba, Ltd.) and the presence of aggregate particles were evaluated according to the following criteria:

A: Change in the particle size was not found, and the aggregate particle was not observed at all.
B: The particle size increased somewhat, and small aggregate particles were observed.
C: The particle size largely increased, and many small and large aggregate particles were observed.

<Discharge Stability of Ink>

A: The nozzle clogging did not occur at all after the continuous discharge for 24 hours.
B: The nozzle clogging occurred after two to three hours of the continuous discharge and the discharge was terminated.
C: The nozzle clogging occurred within one hour of the continuous discharge and the discharge was not performed at all.

<Image Quality of Drawn Image>

A: The drawn image was good without blur and lack of image.
B: The lack of image was partially observed although the blur was not found.
C: The drawn image was poor due to the occurrence of the blur and lack of image.

<Scratch Resistance of Image>

A: The lack of image upon the rubbing with fingers was not recognized at all.
B: The lack of image upon the rubbing with fingers was slightly recognized.
C: The lack of image upon the rubbing with fingers was readily recognized.

COMPARATIVE EXAMPLES 1 TO 5

Kneaded pigment mixtures for Comparative Examples 1 to 4 were obtained by conducting the melt-kneading in the same manner as in Example 1 except for using Comparative Binder Resin (R-1) described above, which was an acrylic resin containing no aliphatic cyclic hydrocarbon component, Comparative Binder Resins (R-2) and (R-3) described above each including an aromatic hydrocarbon component, and a polyester resin (GV-230 manufactured by Toyobo Co., Ltd.) in place of Binder Resin (BP-1) having the aliphatic cyclic hydrocarbon component according to the invention, respectively. For Comparative Example 5, a polyester master batch (Hostacopy C601 manufactured by Clariant Ltd.) was used as the kneaded pigment mixture. Using the kneaded pigment mixtures, Comparative Ink Compositions (S-1) to (S-5) were prepared in the same manner as in Example 1. The surface tension of each of the ink compositions was adjusted to 23 mN/m, and the viscosity thereof was adjusted in a range of from 10 to 14 cp by controlling the concentration of pigment resin particles. The results of evaluating the characteristics of Comparative Ink Compositions (S-1) to (S-5) are shown in Table C below.

TABLE C

| | Particle size of Pigment Resin Particles (µm) | Dispersion Stability of ink Composition | Discharge Stability (nozzle clogging) | Image Quality of Drawn Image | Scratch Resistance of Drawn Image |
|---|---|---|---|---|---|
| Example 1 | 0.19 | A | A | A | A |
| Comparative Example 1 | 0.44 | C | C | C | C |
| Comparative Example 2 | 0.65 | C | C | C | C |
| Comparative Example 3 | 0.71 | C | C | C | C |
| Comparative | 1.32 | C | C | C | C |

TABLE C-continued

| | Particle size of Pigment Resin Particles (μm) | Dispersion Stability of ink Composition | Discharge Stability (nozzle clogging) | Image Quality of Drawn Image | Scratch Resistance of Drawn Image) |
|---|---|---|---|---|---|
| Example 4 Comparative Example 5 | 1.39 | C | C | C | C |

From the results shown in Table C, it can be seen that in Ink Composition (IJ-1) of Example 1 using the binder resin of the block copolymer containing the aliphatic cyclic hydrocarbon component, the pigment resin particles are dispersed in the fine particulate state and the ink composition is excellent in the dispersion stability without the occurrence of aggregation and precipitation even after the preservation for a long period of time. On the contrary, in Comparative Ink Compositions (S-1) to (S-5) of Comparative Examples 1 to 5, the coarse pigment resin particles were present, and the severe aggregation occurred during the preservation for a short period of time. With respect to the discharge stability, while that of Ink Composition (IJ-1) of Example 1 was good without the occurrence of nozzle clogging, with Comparative Ink Compositions (S-1) to (S-5) of Comparative Examples 1 to 5, the ink discharge became unstable and the nozzle clogging occurred within one hour of the continuous discharge. With respect to the drawn image by the inkjet recording device, while Ink Composition (IJ-1) of Example 1 provided the clear drawn image of good quality without ink blur, with Comparative Ink Compositions (S-1) to (S-5) of Comparative Examples 1 to 5, the occurrence of blur and lack of image was observed. With respect to the scratch resistance of the drawn image, while Ink Composition (IJ-1) of Example 1 was extremely excellent in the scratch resistance so that the lack of image upon the rubbing by fingers was not observed at all, with Comparative Ink Compositions (S-1) to (S-5) of Comparative Examples 1 to 5, the lack of image was recognized upon the rubbing by fingers.

As described above, it is apparent that the ink composition using the binder resin of the block copolymer containing the aliphatic cyclic hydrocarbon component according to the invention is excellent in the dispersion stability due to the fine particulate dispersion of pigment resin particles, is excellent in the discharge stability without the occurrence of nozzle clogging, provides the clear drawn image of good quality without ink blur, and is excellent in the scratch resistance of the drawn image.

EXAMPLE 2

Ink Composition (IJ-2)

A mixture of 100 parts by weight of Linol Red 6B FG-4213 (Pigment Red 57:1, manufactured by Toyo Ink Mfg. Co., Ltd.) as red pigment and 100 parts by weight of Binder Resin (BP-3) was preliminary pulverized and well mixed in a trio blender, and then melt-kneaded in a desktop kneader (PBV manufactured by Irie Firm Co., Ltd.) heated at 120° C. for 120 minutes. The resulting kneaded pigment mixture was pulverized in a pin mill. A mixture of 18 parts by weight of the kneaded pigment mixture, 16 parts by weight of Isopar G and 90 parts by weight of a 20 wt % solution of Dispersant for Pigment (D-1) dissolved in Isopar G described in Example 1 was preliminary dispersed together with 250 parts by weight of glass beads (MK-3GX) in a paint shaker (manufactured by Toyo Seiki Co., Ltd.) for 30 minutes, and then subjected wet type dispersion by Dyno-Mill Type KDL (manufactured by Shinmaru Enterprises Corp.) at 3,000 rpm for 2 hours. The volume average particle size of pigment resin particles in the resulting dispersion was 0.15 μm and the pigment resin particles were well dispersed.

Ink Composition (IJ-2) was prepared in the same manner as in Example 1. The surface tension of the ink composition was adjusted to 23 mN/m, and the viscosity thereof was adjusted to 12 cp by controlling the concentration of pigment resin particles. The image drawing characteristics were evaluated in the same manner as in Example 1. The discharge was stably conducted without causing nozzle clogging for a long period of time. The resulting drawn image was good and clear without blur and the image density thereof was 1.5. The scratch resistance in the solid image portion was also excellent. The ink composition was free from aggregation and precipitation and extremely good in dispersibility even after the preservation for a long period of time.

EXAMPLES 3 TO 16

Ink Compositions (IJ-3) to (IJ-16)

Ink Compositions (IJ-3) to (IJ-16) were obtained by the melt-kneading and wet type dispersion in the same manner as in Example 2 except that each of the binder resins shown in Table D below was used in place of Binder Resin (BP-3) and that the temperature for melt-kneading was set 20 to 30° C. higher than the softening point of the binder resin in the temperature range of from 80 to 150° C. The surface tension of each of the ink compositions was adjusted to 23 mN/m, and the viscosity thereof was adjusted in a range of from 10 to 14 cp by controlling the concentration of pigment resin particles. The volume average particle sizes of pigment resin particles in the dispersions of Ink Compositions (IJ-3) to (IJ-16) measured are shown in Table D below.

The image drawing characteristics of Ink Compositions (IJ-3) to (IJ-16) were evaluated in the same manner as in Example 2. With each of the ink compositions, the discharge was stably conducted without causing nozzle clogging for a long period of time. The resulting drawn images were good and clear without blur and had the sufficient image density. It was also found that the scratch resistance in the solid image portion was excellent. Ink Compositions (IJ-3) to (IJ-16) were free from aggregation and precipitation and extremely good in dispersibility even after the preservation for a long period of time.

TABLE D

| Ink Composition | Binder Resin | Volume Average Particle Size of Pigment Resin Particles (μm) |
|---|---|---|
| IJ-3 | BP-1 | 0.19 |
| IJ-4 | BP-4 | 0.21 |
| IJ-5 | BP-5 | 0.18 |
| IJ-6 | BP-7 | 0.18 |
| IJ-7 | BP-8 | 0.17 |
| IJ-8 | BP-9 | 0.19 |
| IJ-9 | BP-10 | 0.21 |
| IJ-10 | BP-12 | 0.19 |
| IJ-11 | BP-13 | 0.20 |

TABLE D-continued

| Ink Composition | Binder Resin | Volume Average Particle Size of Pigment Resin Particles (μm) |
|---|---|---|
| IJ-12 | BP-15 | 0.18 |
| IJ-13 | BP-16 | 0.22 |
| IJ-14 | BP-17 | 0.17 |
| IJ-15 | BP-18 | 0.18 |
| IJ-16 | BP-20 | 0.20 |

EXAMPLES 17 TO 21

Ink Compositions (IJ-17) to (IJ-21)

Ink Compositions (IJ-17) to (IJ-21) were obtained in the same manner as in Example 2 except that each of the yellow pigment, red pigments, black pigment and blue pigment shown in Table E below was used in place of the red pigment, i.e., Linol Red 6B FG-4213 (Pigment Red 57:1, manufactured by Toyo Ink Mfg. Co., Ltd.) and that 200 g of Binder Resin (BP-10) was used in place of 100 g of Binder Resin (BP-3), respectively. The surface tension of each of the ink compositions was adjusted to 23 mN/m, and the viscosity thereof was adjusted to 12 cp. The volume average particle sizes of pigment resin particles in the dispersions of Ink Compositions (IJ-17) to (IJ-21) measured are shown in Table E below.

The image drawing characteristics of Ink Compositions (IJ-17) to (IJ-21) were evaluated in the same manner as in Example 1. With each of the ink composition, the discharge was stably conducted without causing nozzle clogging for a long period of time. The resulting drawn images were good and clear without blur and had the sufficient image density. It was also found that the scratch resistance in the solid image portion was excellent. Ink Compositions (IJ-17) to (IJ-21) were free from aggregation and precipitation and extremely good in dispersibility even after the preservation for a long period of time.

TABLE E

| Ink Composition | Coloring Agent | Volume Average Particle Size of Pigment Resin Particles (μm) |
|---|---|---|
| IJ-17 | Toner Yellow HG *1 | 0.19 |
| IJ-18 | Linol Blue FG7350 *2 | 0.17 |
| IJ-19 | Toner Magenta E02 *3 | 0.18 |
| IJ-20 | Carbon Black MA-8 *4 | 0.16 |
| IJ-21 | Hostabarm Blue B2G *5 | 0.16 |

*1 Pigment Yellow 180 (manufactured by Clariant Ltd.)
*2 Pigment Blue 15:3 (manufactured by Toyo Ink Mfg. Co., Ltd.)
*3 Pigment Red 122 (manufactured by Clariant Ltd.)
*4 Pigment Black 7 (manufactured by Mitsubishi Chemical Corp.)
*5 Pigment Blue 15:3 (manufactured by Clariant Ltd.)

EXAMPLE 22

Ink Composition (IJ-22)

The wet type dispersion was conducted in the same manner as in Example 2 except that a commercially available dispersant for pigment (Solsperse 17000 manufactured by Avecia Ltd.) in place of Dispersant for Pigment (D-1) and that Binder Resin (BP-10) was used in place of Binder Resin (BP-3). The volume average particle size of pigment resin particles in the resulting dispersion was 0.25 μm. Surface tension and viscosity of the dispersion were adjusted to 23 mN/m and 10 cp respectively to obtain Ink Composition (IJ-22).

The image drawing characteristics of Ink Composition (IJ-22) were evaluated in the same manner as in Example 1. The discharge was stably conducted without causing nozzle clogging for a long period of time. The resulting drawn images were good and clear without blur and had the sufficient image density. It was also found that the scratch resistance in the solid image portion was excellent. Ink Composition (IJ-22) was free from aggregation and precipitation and extremely good in dispersibility even after the preservation for a long period of time.

EXAMPLES 23 TO 25

Ink Compositions (IJ-23) to (IJ-25)

Ink Compositions (IJ-23) to (IJ-25) were obtained by the wet type dispersion in the same manner as in Example 2 except that each of Dispersants for Pigment (D-2) to (D-4) was used in place of Dispersant for Pigment (D-1) and that the surface tension and viscosity were adjusted to 23 mN/m and a range of from 10 to 14 cp respectively. The volume average particle sizes of pigment resin particles in the dispersions of Ink Compositions (IJ-23) to (IJ-25) measured are shown in Table F below. The image drawing characteristics of Ink Compositions (IJ-23) to (IJ-25) were evaluated in the same manner as in Example 1. With each of the ink compositions, the discharge was stably conducted without causing nozzle clogging for a long period of time. The resulting drawn images were good and clear without blur and had the sufficient image density. It was also found that the scratch resistance in the solid image portion was excellent. Ink Compositions (IJ-23) to (IJ-25) were free from aggregation and precipitation and extremely good in dispersibility even after the preservation for a long period of time.

TABLE E

| Ink Composition | Dispersant for Pigment | Volume Average Particle Size of Pigment Resin Particles (μm) |
|---|---|---|
| IJ-23 | D-2 | 0.17 |
| IJ-24 | D-3 | 0.18 |
| IJ-25 | D-4 | 0.22 |

Dispersants for Pigment (D-2) and (D-3) have the structures shown below, respectively.

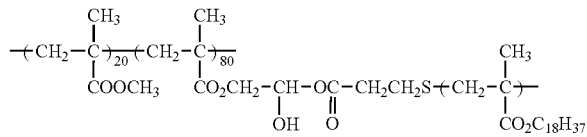

Dispersant for Pigment (D-2)

-continued

Dispersant for Pigment (D-3)

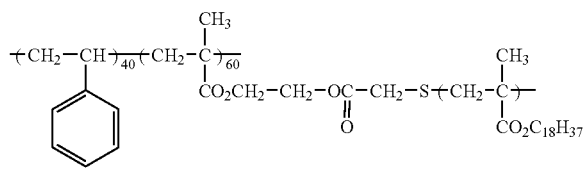

(copolymerization ratio is represented by weight ratio)

Dispersant for Pigment (D-4) was prepared in the manner described below.

<Preparation of Dispersant for Pigment (D-4)>

Using a styrene based macromonomer (terminal group: methacryloyl group, number average molecular weight: 6,000) commercially available as AS-6 from Toagosei Co., Ltd., Dispersant for Pigment (D-4) was prepared. Specifically, a mixed solution of 50 g of the styrene based macromonomer (AS-6), 50 g of stearyl methacrylate and 200 g of toluene was put into a four-necked flask and heated to a temperature of 80° C. with stirring under a nitrogen gas stream. To the mixed solution was added 1 g of 1,1'-azobis (1-cyclohexanecarbonitrile) as a polymerization initiator, followed by conducting polymerization at 80° C. for 24 hours. After the polymerization, the reaction mixture was cooled to a room temperature, 200 g of toluene was further added thereto, and reprecipitated in 4 liters of methanol. The white powder collected by filtration was dried to obtain 92 g of a graft copolymer, i.e., [P(stearyl methacrylate)-g-P (styrene)] as powder. The graft copolymer had a weight average molecular weight (Mw) of $7.9 \times 10^4$.

PREPARATION EXAMPLE 1 OF MACROMONOMER

Macromonomer (M-1)

A mixed solution of 100 g of octadecyl methacrylate, 1 g of thioglycolic acid and 200 g of toluene was heated to a temperature of 75° C. with stirring under a nitrogen gas stream. To the solution was added 1.5 g of 2,2'-azobis (isobutyronitrile) (abbreviated as AIBN), followed by reacting for 4 hours. Then, 0.5 g of AIBN was added thereto, followed by reacting for 3 hours, and further 0.3 g of AIBN was added thereto, followed by reacting for 3 hours. The reaction solution was cooled to a room temperature, and 2.8 g of 2-hydoxyethyl methacrylate was added thereto. A mixed solution of 4.5 g of dicyclohexylcarbodiimide (abbreviated as DCC) and 10 g of methylene chloride was added dropwise thereto over a period of one hour. Then, 0.1 g of 4-dimethylaminopyridine and 0.1 g of tert-butylhydroquinone were added to the reaction solution, followed by stirring for 4 hours.

The crystals deposited were removed by filtration, and the filtrate was reprecipitated in 2 liters of methanol. The resulting white solid was collected by decantation, dissolved in 300 ml of tetrahydrofuran, and reprecipitated again in 3 liters of methanol. The resulting white powder was collected by decantation and dried under a reduced pressure to obtain Macromonomer (M-1) having a weight average molecular weight of 12,100 in a yield of 93.2 g. The weight average molecular weight (Mw) was measured by a GPC method and calculated in terms of polystyrene.

Macromonomer (M-1)

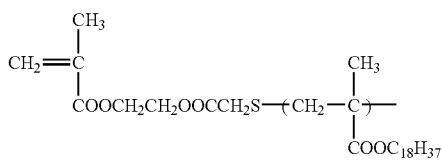

PREPARATION EXAMPLES 2 TO 18 OF MACROMONOMER

Macromonomers (M-2) to (M-18)

Macromonomers (M-2) to (M-18) shown in Table G below were prepared in the same manner as in Preparation Example 1 of Macromonomer except that a methacrylate monomer (corresponding to octadecyl methacrylate), a chain transfer agent (corresponding to thioglycolic acid), an initiator (corresponding to AIBN) and an unsaturated carboxylic acid ester (corresponding to 2-hydoxyethyl methacrylate) were changed to the corresponding compounds, respectively. The weight average molecular weight of each macromonomer obtained was in a range of from 1,000 to 31,400.

TABLE G

| Preparation Example of Macromonomer | Macromonomer (Weight Average Molecular Weight) | Chemical Structure of Macromonomer |
|---|---|---|
| 2 | M-2 (Mw = 12,600) | CH₂=C(CH₃)COOCH₂CH₂OOC—CH₂S⁅CH₂—C(CH₃)⁆COOCH₂CH⁅CH₂⁆₃CH₃ \| C₂H₅ |

TABLE G-continued

| Preparation Example of Macromonomer | Macromonomer (Weight Average Molecular Weight) | Chemical Structure of Macromonomer |
|---|---|---|
| 3 | M-3 (Mw = 11,800) | $CH_2=C(CH_3)COOCH_2CH(OH)CH_2OOC-(CH_2)_2-S-[CH_2-C(CH_3)(COOC_{18}H_{37})]_n$ |
| 4 | M-4 (Mw = 16,500) | $CH_2=C(CH_3)COO(CH_2)_2OOC(CH_2)_2-S-[CH_2-C(CH_3)(COOC_{12}H_{25})]_n$ |
| 5 | M-5 (Mw = 4,600) | $CH_2=C(CH_3)CH_2COOCH_2CH_2S-[CH_2-C(CH_3)(COOC_{18}H_{37})]_n$ |
| 6 | M-6 (Mw = 9,800) | $CH_2=CH-COOCH_2CH_2S-[CH_2-C(CH_3)(COOC_{12}H_{25})]_n$ |
| 7 | M-7 (Mw = 13,000) | $CH_2=C(CH_3)COOCH_2CH(OH)CH_2OOC(CH_2)_2C(CH_3)(CN)-[CH_2-C(CH_3)(COOC_{18}H_{37})]_n$ |
| 8 | M-8 (Mw = 14,400) | $CH_2=C(CH_3)COO(CH_2)_2OOC(CH_2)_2-C(CH_3)(CN)-[CH_2-C(CH_3)(COOCH_2CH(C_2H_5)(CH_2)_3CH_3)]_n$ |
| 9 | M-9 (Mw = 28,300) | $CH_2=C(CH_3)CONH-(CH_2)_{10}-COOCH_2CH_2S-[CH_2-C(CH_3)(COOC_8H_{17})]_n$ |
| 10 | M-10 (Mw = 21,400) | $CH_2=C(CH_3)COOCH_2CH_2OOC-CH_2-S-[CH_2-C(CH_3)(COOC_{18}H_{37})]_n$ |
| 11 | M-11 (Mw = 20,000) | $CH_2=C(CH_3)COO-(CH_2)_2-N(H)COO-CH_2-CH(OH)-CH_2-S-[CH_2-C(CH_3)(COO(CF_2)_7CF_3)]_n$ |

TABLE G-continued

| Preparation Example of Macromonomer | Macromonomer (Weight Average Molecular Weight) | Chemical Structure of Macromonomer |
|---|---|---|
| 12 | M-12 (Mw = 12,000) | $CH_2=C(CH_3)-COOCH_2CH(OH)-CH_2-OOC-(CH_2)_2-S-[CH_2-CH]-COO(CF_2)_7CF_3$ |
| 13 | M-13 (Mw = 13,300) | $CH_2=C(CH_3)-COO-(CH_2)_2-OOC(CH_2)_2-S-[CH_2-C(CH_3)]-COO(CH_2)_2-C_6F_{13}$ |
| 14 | M-14 (Mw = 31,400) | $CH_2=C(CH_3)-COO(CH_2)_2OOC-(CH_2)_2-S-[CH_2-C(CH_3)]-$ OCOC$_3$F$_7$ / COOCH$_2$CHCH$_2$ / OCOC$_3$F$_7$ |
| 15 | M-15 (Mw = 1,000) | $CH_2=C(CH_3)-COOC_3H_6-Si(CH_3)_2-O-[Si(CH_3)_2-O]_n-Si(CH_3)_2-CH_3$ |
| 16 | M-16 (Mw = 5,000) | $CH_2=C(CH_3)-COOC_3H_6-Si(CH_3)_2-O-[Si(CH_3)_2-O]_n-Si(CH_3)_2-CH_2CH_3$ |
| 17 | M-17 (Mw = 10,000) | $CH_2=C(CH_3)-COOC_3H_6-Si(CH_3)_2-[Si(CH_3)_2-O]_n-Si(CH_3)_2-CH_2CH_3$ |
| 18 | M-18 (Mw = 21,500) | $CH_2=C(CH_3)-COOCH_2-CH(OH)-CH_2OOC-(CH_2)_2-S-[CH_2-C(CH_3)]-COO(CH_2)_3-Si(Y)_3$ Y: $-OSi(CH_3)_3$ |

PREPARATION EXAMPLE 1 OF GRAFT COPOLYMER FOR BINDER RESIN

Binder Resin (GP-1)

A mixed solution of 80 g of cyclohexyl methacrylate, 20 g of Macromonomer (M-1) described above and 200 g of toluene was put into a four-necked flask and heated to a temperature of 80° C. with stirring under a nitrogen gas stream. To the mixed solution was added 1 g of 1,1'-azobis (1-cyclohexanecarbonitrile) as a polymerization initiator, followed by conducting polymerization at 80° C. for 24 hours. After the polymerization, the reaction mixture was cooled to a room temperature, 200 g of toluene was further added thereto, and reprecipitated in 4 liters of methanol. The white powder collected by filtration was dried to obtain 92 g of a graft copolymer. The graft copolymer had a weight average molecular weight of $6.3 \times 10^4$.

PREPARATION EXAMPLES 2 TO 26 OF GRAFT COPOLYMER FOR BINDER RESIN

Binder Resins (GP-2) to (GP-26)

Binder Resins (GP-2) to (GP-26) were prepared in the same manner as in Preparation Example 1 of Graft Copolymer for Binder Resin except for changing the cyclohexyl methacrylate and Macromonomer (M-1) to each of the compounds described in Table H below, respectively. The weight average molecular weight of each of the graft copolymers for binder resins was in a range of from $2.8 \times 10^4$ to $10.1 \times 10^4$.

TABLE H

| Specific Example of Resin | Monomer A | Macromonomer (M) | Monomer C2 | Feed Ratio of A/M/C2 (Weight ratio) |
|---|---|---|---|---|
| GP-2 | A-4 | M-3 | — | 60/40/0 |
| GP-3 | A-11 | M-2 | — | 80/20/0 |
| GP-4 | A-8 | M-4 | — | 80/20/0 |
| GP-5 | A-4 | M-17 | — | 80/20/0 |
| GP-6 | A-4 | M-17 | — | 60/40/0 |
| GP-7 | A-4 | M-3 | MMA | 70/20/10 |
| GP-8 | A-4 | M-3 | MMA | 50/30/20 |
| GP-9 | A-4 | M-3 | MMA | 80/10/10 |
| GP-10 | A-4 | M-16 | MMA | 70/20/10 |
| GP-11 | A-11 | M-10 | MMA | 60/20/20 |
| GP-12 | A-11 | M-10 | MMA/MAA | 50/30/(10/10) |
| GP-13 | A-11 | M-10 | MMA/DEMA | 70/10/(10/10) |
| GP-14 | A-11 | M-17 | MMA | 60/20/20 |
| GP-15 | A-11 | M-12 | MMA/MAA | 70/10/(10/10) |
| GP-16 | A-1 | M-6 | MA | 50/30/20 |
| GP-17 | A-5 | M-7 | MMA/MAA | 60/10/(20/10) |
| GP-18 | A-6 | M-8 | EMA | 70/20/10 |
| GP-19 | A-8 | M-9 | MMA | 50/40/10 |
| GP-20 | A-10 | M-10 | MMA | 60/20/20 |
| GP-21 | A-12 | M-11 | EMA | 50/30/20 |
| GP-22 | A-14 | M-13 | EA/MAA | 60/20/(10/10) |
| GP-23 | A-17 | M-17 | MMA | 50/30/20 |
| GP-24 | A-11 | M-1 | EMA/MAA | 60/20/(10/10) |
| GP-25 | A-19 | M-17 | MMA | 50/30/20 |
| GP-26 | A-20 | M-18 | MMA | 70/20/10 |

MMA: Methyl methacrylate
EMA: Ethyl methacrylate
MA: Methyl acrylate
EA: Ethyl acrylate
DEMA: N,N-Diethylaminoethyl methacrylate
MAA: Methacrylic acid

PREPARATION EXAMPLE 4 OF COMPARATIVE BINDER RESIN

Comparative Binder Resin (R-4)

A mixed solution of 80 g of methyl methacrylate, 20 g of stearyl methacrylate and 200 g of toluene was heated at a temperature of 80° C. with stirring under in a nitrogen gas stream for one hour. To the mixed solution was added 1.0 g of 2,2'-azobis(isobutyronitrile) (abbreviated as AIBN) as a polymerization initiator, followed by reacting for 4 hours. Then, 1.0 g of AIBN was added thereto, followed by reacting for 2 hours, and further 0.5 g of AIBN was added thereto, followed by reacting for 2 hours. After cooling, the mixed solution was reprecipitated in 5 liters of methanol to obtain Comparative Binder Resin (R-4). The weight average molecular weight (Mw) thereof was $3.3 \times 10^4$.

PREPARATION EXAMPLES 5 AND 6 OF COMPARATIVE BINDER RESIN

Comparative Binder Resins (R-5) and (R-6)

Comparative Binder Resins (R-5) and (R-6) were prepared in the same manner as in Preparation Example 4 of Comparative Binder Resin (R-4) except for using the monomers described in Table I below in place of 80 g of methyl methacrylate and 20 g of stearyl methacrylate, respectively. The weight average molecular weights (Mw) of the comparative binder resins were $2.6 \times 10^4$ and $3.1 \times 10^4$, respectively.

TABLE I

| Preparation Example of Comparative Binder Resin | Comparative Binder Resin | Comparative Monomer |
|---|---|---|
| 2 | R-5 | Benzyl methacrylate 80 g<br>SMA 20 g |
| 3 | R-6 | Benzyl methacrylate 60 g<br>SMA 20 g<br>MMA 20 g |

SMA: Stearyl methacrylate
MMA: Methyl methacrylate

EXAMPLE 26

Ink Composition (IJ-26)

A mixture of 100 parts by weight of Linol Blue FG-7350 (Pigment Blue 15:3, manufactured by Toyo Ink Mfg. Co., Ltd.) as blue pigment and 100 parts by weight of Binder Resin (GP-1) was preliminary pulverized and well mixed in a trio blender, and then melt-kneaded in a three-roll mill heated at 90° C. for 60 minutes. The kneaded pigment mixture was pulverized in a pin mill.

A mixture of 10 parts by weight of the resulting kneaded pigment mixture, 40 parts by weight of isoparaffinic hydrocarbon (Isopar G (trade name) manufactured by Exxon Chemical Co., hereinafter abbreviated as Isopar G) and 50 parts by weight of a 20 wt % solution prepared by dissolving Dispersant for Pigment (D-1) described above in Isopar G by heating was blended together with 250 parts by weight of glass beads (3G-X) in a paint shaker (manufactured by Toyo Seiki Co., Ltd.) for 90 minutes. The volume average particle size of pigment resin particles in the resulting dispersion was measured by an ultra-centrifugal automatic particle size distribution analyzer (CAPA700 manufactured by Horiba, Ltd.) and found to be 0.17 μm, and the pigment resin particles were well dispersed.

After removing the glass beads by filtration, the above-described dispersion of pigment resin particles was once concentrated by solvent distillation and then diluted with Isopar G to prepare Ink Composition (IJ-26). The ink composition has a concentration of the pigment resin particles of 16 wt %, a viscosity of 10 cp (measured by an E type viscometer at a temperature of 25° C.) and a surface tension of 23 mN/m (measured by an automatic surface tensiometer manufactured by Kyowa Interface Science Co., Ltd. at a temperature of 25° C.).

Ink Composition (IJ-26) was charged in a color facsimile (SAIYUKI UX-E1CL manufactured by Sharp Corp.) as an ink-jet recording device, and an image was drawn on an exclusive use paper of inkjet paper high-grade manufactured by Fuji Photo Film Co., Ltd. As a result, the discharge was stably conducted without causing nozzle clogging. The resulting drawn image was good and clear without blur and the image density thereof was 1.5. Further, a solid pattern was printed, and after drying the print, the solid image portion thereof was rubbed by fingers. As a result, lack of image was not observed at all, so that it was found that the scratch resistance was extremely excellent. The ink composition was free from aggregation and precipitation and extremely good in dispersibility even after the preservation for a long period of time.

The evaluation criteria of the ink composition are described below.

<Dispersion Stability of Ink>

After the preparation, the ink composition was allowed to stand at a temperature of 35° C. for one month. A container of the ink composition was shaken by hand several times and particle size (measured by the ultra-centrifugal automatic particle size distribution analyzer CAPA700 manufactured by Horiba, Ltd.) and the presence of aggregate particles were evaluated according to the following criteria:
A: Change in the particle size was not found, and the aggregate particle was not observed at all.
B: The particle size increased somewhat, and small aggregate particles were observed.
C: The particle size largely increased, and many small and large aggregate particles were observed.

<Discharge Stability of Ink>
A: The nozzle clogging did not occur at all after the continuous discharge for 24 hours.
B: The nozzle clogging occurred after two or three hours of the continuous discharge and the discharge was terminated.
C: The nozzle clogging occurred within one hour of the continuous discharge and the discharge was not performed at all.

<Image Quality of Drawn Image>
A: The drawn image was good without blur and lack of image.
B: The lack of image was partially observed although the blur was not found.
C: The drawn image was poor due to the occurrence of the blur and lack of image.

<Scratch Resistance of Image>
A: The lack of image upon the rubbing by fingers was not recognized at all.
B: The lack of image upon the rubbing by fingers was slightly recognized.
C: The lack of image upon the rubbing by fingers was readily recognized.

COMPARATIVE EXAMPLES 6 TO 10

Kneaded pigment mixtures for Comparative Examples 6 to 9 were obtained by conducting the melt-kneading in the same manner as in Example 26 except for using Comparative Binder Resin (R-4) described above, which was an acrylic resin containing no aliphatic cyclic hydrocarbon component, Comparative Binder Resins (R-5) and (R-6) described above each including an aromatic hydrocarbon component, and a polyester resin (GV-230 manufactured by Toyobo Co., Ltd.) in place of Binder Resin (GP-1) having the aliphatic cyclic hydrocarbon component according to the invention, respectively. For Comparative Example 10, a polyester master batch (Hostacopy C601 manufactured by Clariant Ltd.) was used as the kneaded pigment mixture.

Using the kneaded pigment mixtures, Comparative Ink Compositions (S-6) to (S-10) were prepared in the same manner as in Example 26. The surface tension of each of the ink compositions was adjusted to 23 mN/m, and the viscosity thereof was adjusted in a range of from 10 to 14 cp by controlling the concentration of pigment resin particles. The results of evaluating the characteristics of Comparative Ink Compositions (S-6) to (S-10) are shown in Table J below.

TABLE J

| | Particle size of Pigment Resin Particles (μm) | Dispersion Stability of ink Composition | Discharge Stability (nozzle clogging) | Image Quality of Drawn Image | Scratch Resistance of Drawn Image |
|---|---|---|---|---|---|
| Example 26 | 0.17 | A | A | A | A |
| Comparative Example 6 | 0.44 | C | C | C | C |
| Comparative Example 7 | 0.61 | C | C | C | C |
| Comparative Example 8 | 0.69 | C | C | C | C |
| Comparative Example 9 | 1.30 | C | C | C | C |
| Comparative Example 10 | 1.37 | C | C | C | C |

From the results shown in Table J, it can be seen that in Ink Composition (IJ-26) of Example 26 using the binder resin of the block copolymer containing the aliphatic cyclic hydrocarbon component, the pigment resin particles are dispersed in the fine particulate state and the ink composition is excellent in the dispersion stability without the occurrence of aggregation and precipitation even after the preservation for a long period of time. On the contrary, in Comparative Ink Compositions (S-6) to (S-10) of Comparative Examples 6 to 10, the coarse pigment resin particles were present, and the severe aggregation occurred during the preservation for a short period of time. With respect to the discharge stability, while that of Ink Composition (IJ-26) of Example 26 was good without the occurrence of nozzle clogging, with Comparative Ink Compositions (S-6) to (S-10) of Comparative Examples 6 to 10, the ink discharge became unstable and the nozzle clogging occurred within one hour of the continuous discharge. With respect to the drawn image by the inkjet recording device, while Ink Composition (IJ-26) of Example 26 provided the clear drawn image of good quality without ink blur, with Comparative Ink Compositions (S-6) to (S-10) of Comparative Examples 6 to 10, the occurrence of blur and lack of image was observed. With respect to the scratch resistance of the drawn image, while Ink Composition (IJ-26) of Example 26 was extremely excellent in the scratch resistance so that the lack of image upon the rubbing by fingers was not observed at all, with Comparative Ink Compositions (S-6) to (S-10) of Comparative Examples 6 to 10, the lack of image was recognized upon the rubbing by fingers.

As described above, it is apparent that the ink composition using the binder resin of the block copolymer containing the aliphatic cyclic hydrocarbon component according to the invention is excellent in the dispersion stability due to the fine particulate dispersion of pigment resin particles, is excellent in the discharge stability without the occurrence of nozzle clogging, provides the clear drawn image of good quality without ink blur, and is excellent in the scratch resistance of the drawn image.

EXAMPLE 27

Ink Composition (IJ-27)

A mixture of 100 parts by weight of Linol Blue FG-7350 (Pigment Blue 15:3, manufactured by Toyo Ink Mfg. Co., Ltd.) as blue pigment and 100 parts by weight of Binder Resin (GP-3) was preliminary pulverized and well mixed in a trio blender, and then melt-kneaded in a desktop kneader (PBV manufactured by Irie Firm Co., Ltd.) heated at 100° C. for 120 minutes. The resulting kneaded pigment mixture was pulverized in a pin mill. A mixture of 20 parts by weight of the kneaded pigment mixture, 30 parts by weight of Isopar G and 75 parts by weight of a 20 wt % solution of Dispersant for Pigment (D-1) dissolved in Isopar G described in Example 26 was preliminary dispersed together with 250 parts by weight of glass beads (MK-3GX) in a paint shaker (manufactured by Toyo Seiki Co., Ltd.) for 30 minutes, and then subjected wet type dispersion by Dyno-Mill Type KDL (manufactured by Shinmaru Enterprises Corp.) at 3,000 rpm for 2 hours. The volume average particle size of pigment resin particles in the resulting dispersion was 0.14 μm and the pigment resin particles were well dispersed.

Ink Composition (IJ-27) was prepared in the same manner as in Example 26. The surface tension of the ink composition was adjusted to 23 mN/m, and the viscosity thereof was adjusted to 12 cp by controlling the concentration of pigment resin particles. The image drawing characteristics were evaluated in the same manner as in Example 26. The discharge was stably conducted without causing nozzle clogging for a long period of time. The resulting drawn image was good and clear without blur and the image density thereof was 1.5. The scratch resistance in the solid image portion was also excellent. The ink composition was free from aggregation and precipitation and extremely good in dispersibility even after the preservation for a long period of time.

EXAMPLES 28 TO 43

Ink Compositions (IJ-28) to (IJ-43)

Ink Compositions (IJ-28) to (IJ-43) were obtained by the melt-kneading and wet type dispersion in the same manner as in Example 27 except that each of the binder resins shown in Table K below was used in place of Binder Resin (GP-3) and that the temperature for melt-kneading was set 20 to 30° C. higher than the softening point of the binder resin in the temperature range of from 80 to 150° C. The surface tension of each of the ink compositions was adjusted to 23 mN/m, and the viscosity thereof was adjusted in a range of from 10 to 14 cp by controlling the concentration of pigment resin particles. The volume average particle sizes of pigment resin particles in the dispersions of Ink Compositions (IJ-28) to (IJ-43) measured are shown in Table K below.

The image drawing characteristics of Ink Compositions (IJ-28) to (IJ-43) were evaluated in the same manner as in Example 27. With each of the ink compositions, the discharge was stably conducted without causing nozzle clogging for a long period of time. The resulting drawn images were good and clear without blur and had the sufficient image density. It was also found that the scratch resistance in the solid image portion was excellent. Ink Compositions (IJ-28) to (IJ-43) were free from aggregation and precipitation and extremely good in dispersibility even after the preservation for a long period of time.

TABLE K

| Ink Composition | Binder Resin | Volume Average Particle Size of Pigment Resin Particles (μm) |
|---|---|---|
| IJ-28 | Gp-2 | 0.19 |
| IJ-29 | GP-4 | 0.20 |
| IJ-30 | GP-5 | 0.18 |
| IJ-31 | GP-7 | 0.18 |
| IJ-32 | GP-9 | 0.17 |
| IJ-33 | GP-10 | 0.19 |
| IJ-34 | GP-11 | 0.20 |
| IJ-35 | GP-13 | 0.16 |
| IJ-36 | GP-14 | 0.19 |
| IJ-37 | GP-16 | 0.20 |
| IJ-38 | GP-17 | 0.18 |
| IJ-39 | GP-19 | 0.22 |
| IJ-40 | GP-20 | 0.17 |
| IJ-41 | GP-23 | 0.18 |
| IJ-42 | GP-24 | 0.20 |
| IJ-43 | GP-26 | 0.20 |

EXAMPLES 44 TO 48

Ink Compositions (IJ-44) to (IJ-48)

Ink Compositions (IJ-44) to (IJ-48) were obtained in the same manner as in Example 27 except that each of the yellow pigment, red pigments, black pigment and blue pigment shown in Table L below was used in place of the blue pigment, i.e., Linol Blue FG-7350 (Pigment Blue 15:3, manufactured by Toyo Ink Mfg. Co., Ltd.) and that 200 g of Binder Resin (GP-10) was used in place of 100 g of Binder Resin (GP-3), respectively. The surface tension of each of the ink compositions was adjusted to 23 mN/m, and the viscosity thereof was adjusted to 12 cp. The volume average particle sizes of pigment resin particles in the dispersions of Ink Compositions (IJ-44) to (IJ-48) measured are shown in Table L below.

The image drawing characteristics of Ink Compositions (IJ-44) to (IJ-48) were evaluated in the same manner as in Example 26. With each of the ink composition, the discharge was stably conducted without causing nozzle clogging for a long period of time. The resulting drawn images were good and clear without blur and had the sufficient image density. It was also found that the scratch resistance in the solid image portion was excellent. Ink Compositions (IJ-44) to (IJ-48) were free from aggregation and precipitation and extremely good in dispersibility even after the preservation for a long period of time.

TABLE L

| Ink Composition | Coloring Agent | Volume Average Particle Size of Pigment Resin Particles (μm) |
|---|---|---|
| IJ-44 | Toner Yellow HG *1 | 0.17 |
| IJ-45 | Linol Red 6B FG4213 *2 | 0.16 |
| IJ-46 | Toner Magenta E02 *3 | 0.16 |
| IJ-47 | Carbon Black MA-8 *4 | 0.17 |
| IJ-48 | Hostabarm Blue B2G *5 | 0.16 |

*1 Pigment Yellow 180 (manufactured by Clariant Ltd.)
*2 Pigment Red 57:1 (manufactured by Toyo Ink Mfg. Co., Ltd.)
*3 Pigment Red 122 (manufactured by Clariant Ltd.)
*4 Pigment Black 7 (manufactured by Mitsubishi Chemical Corp.)
*5 Pigment Blue 15:3 (manufactured by Clariant Ltd.)

EXAMPLE 49 OF INK COMPOSITION

Ink Composition (IJ-49)

The wet type dispersion was conducted in the same manner as in Example 27 except that a commercially available dispersant for pigment (Solsperse 17000 manufactured by Avecia Ltd.) in place of Dispersant for Pigment (D-1) and that Binder Resin (GP-13) was used in place of Binder Resin (GP-3). The volume average particle size of pigment resin particles in the resulting dispersion was 0.24 μm. Surface tension and viscosity of the dispersion were adjusted to 23 mN/m and 11 cp respectively to obtain Ink Composition (IJ-49).

The image drawing characteristics of Ink Composition (IJ-49) were evaluated in the same manner as in Example 26. The discharge was stably conducted without causing nozzle clogging for a long period of time. The resulting drawn images were good and clear without blur and had the sufficient image density. It was also found that the scratch resistance in the solid image portion was excellent. Ink Composition (IJ-49) was free from aggregation and precipitation and extremely good in dispersibility even after the preservation for a long period of time.

EXAMPLES 50 TO 52

Ink Compositions (IJ-50) to (IJ-52)

Ink Compositions (IJ-50) to (IJ-52) were obtained by the wet type dispersion in the same manner as in Example 27 except that each of Dispersants for Pigment (D-2) to (D-4) was used in place of Dispersant for Pigment (D-1) and that the surface tension and viscosity were adjusted to 23 mN/m and a range of from 10 to 14 cp respectively. The volume average particle sizes of pigment resin particles in the dispersions of Ink Compositions (IJ-50) to (IJ-52) measured are shown in Table M below. The image drawing characteristics of Ink Compositions (IJ-50) to (IJ-52) were evaluated in the same manner as in Example 26. With each of the ink compositions, the discharge was stably conducted without causing nozzle clogging for a long period of time. The resulting drawn images were good and clear without blur and had the sufficient image density. It was also found that the scratch resistance in the solid image portion was excellent. Ink Compositions (IJ-50) to (IJ-52) were free from aggregation and precipitation and extremely good in dispersibility even after the preservation for a long period of time.

TABLE M

| Ink Composition | Dispersant for Pigment | Volume Average Particle Size of Pigment Resin Particles (μm) |
|---|---|---|
| IJ-50 | D-2 | 0.15 |
| IJ-51 | D-3 | 0.16 |
| IJ-52 | D-4 | 0.20 |

The usefulness of ink composition of the invention as an oil based ink for inkjet printer has been described using the inkjet printer of piezoelectric system, byway of illustration. However, it should be noted that the invention is not limited to be used in such a system, and can also be applied to ink-jet printers of electrostatic system as typified by slit jet of Toshiba Corp. or NTT Corp., etc. and inkjet printers of thermal system.

In accordance with the ink composition of the invention using the binder resin comprising the block copolymer containing an aliphatic cyclic hydrocarbon group or the graft copolymer containing an aliphatic cyclic hydrocarbon group in the main chain thereof, an oil based ink for inkjet printer in which a pigment is uniformly dispersed in the state of fine particle and dispersion stability of the pigment dispersion is excellent can be provided. Also, an oil based ink for inkjet printer, which has high discharge stability free from the occurrence of clogging in a nozzle section, can be provided. Further, an oil based ink for inkjet printer, which has excellent drying property on recording paper, excellent water resistance and light fastness of recorded image, and high-level scratch resistance, can be provided. Moreover, an oil based ink for inkjet printer, which is capable of providing a large number of prints having clear color images of good quality without ink blur, can be provided.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A method of forming an image by an inkjet recording system using an oil based ink composition, comprising discharging an oil based ink composition from an inkjet recording device, wherein the oil based ink composition comprises fine particles dispersed in a non-aqueous dispersion medium, wherein the fine particles are obtained by melting and kneading a coloring agent and a binder resin and cooling and pulverizing the resulting mixture to provide a colored mixture and subjecting the colored mixture to wet dispersion, wherein each fine particle comprises the coloring agent and the binder resin, and wherein the coloring agent is coated with the binder resin, and wherein the coloring agent comprises a pigment wherein the binder resin comprises a block copolymer having a repeating unit (a) corresponding to a monofunctional monomer containing an aliphatic cyclic hydrocarbon group having from 5 to 30 carbon atoms, and wherein the oil based ink composition further comprises a dispersant for pigment.

2. The method as claimed in claim 1, wherein the binder resin comprises a block copolymer having the repeating unit (a) corresponding to a monofunctional monomer containing an aliphatic cyclic hydrocarbon group having from 5 to 30 carbon atoms and a repeating unit (b1) corresponding to a monofunctional monomer, which is capable of copolymerizing with the monofunctional monomer of the repeating unit (a) and a homopolymer of which is soluble in the non-aqueous dispersion medium.

3. The method as claimed in claim 1, wherein the repeating unit (a) is a repeating unit represented by the following formula (I):

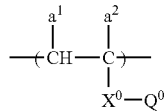

(I)

wherein, $X^0$ represents a connecting group selected from the group consisting of —COO—, —OCO—, —$(CH_2)_k$—OCO—, —$(CH_2)_k$—COO—, —COO$(CH_2)_k$—, —COO$(CH_2O)_k$—, —CONHCOO—, —CONHCONH—, —O—, and a combination of these groups; k represents an integer of from 1 to 3; $a^1$ and $a^2$, which may be the same or different, each represent a hydrogen atom, a halogen atom, a cyano group, an alkyl group, —COO—$Z^1$, or —COO—$Z^1$ connected through a hydrocarbon group; $Z^1$ represents a hydrogen atom or an hydrocarbon group; and $Q^0$ represents an aliphatic cyclic hydrocarbon group having from 5 to 30 carbon atoms.

4. The method as claimed in claim 1, wherein the oil based ink composition has a viscosity of from 1.0 to 40 cp at 25° C.

* * * * *